(12) United States Patent
Weaver et al.

(10) Patent No.: US 10,346,670 B2
(45) Date of Patent: Jul. 9, 2019

(54) FULL-SPECTRUM FLASH FOR ELECTRONIC DEVICES

(71) Applicant: Lumenetix, Inc., Scotts Valley, CA (US)

(72) Inventors: Matthew D. Weaver, Aptos, CA (US); James Kingman, Woodside, CA (US); Jay Hurley, Aptos, CA (US); Jeffrey Saake, San Francisco, CA (US); Sanjoy Ghose, Pismo Beach, CA (US)

(73) Assignee: LUMENETIX, INC., Scotts Valley, CA (US)

( * ) Notice: Subject to any disclaimer, the term of this patent is extended or adjusted under 35 U.S.C. 154(b) by 0 days.

(21) Appl. No.: 16/030,679

(22) Filed: Jul. 9, 2018

(65) Prior Publication Data

US 2019/0014638 A1    Jan. 10, 2019

Related U.S. Application Data

(60) Provisional application No. 62/530,244, filed on Jul. 9, 2017.

(51) Int. Cl.
*H05B 37/00* (2006.01)
*H05B 39/00* (2006.01)
(Continued)

(52) U.S. Cl.
CPC ........... *G06K 9/0004* (2013.01); *G03B 15/05* (2013.01); *G06K 9/66* (2013.01); *H04N 5/2256* (2013.01);
(Continued)

(58) Field of Classification Search
None
See application file for complete search history.

(56) References Cited

U.S. PATENT DOCUMENTS

| 8,136,967 B2 | 3/2012 | Weaver et al. |
| 8,284,279 B2 | 10/2012 | Park et al. |

(Continued)

OTHER PUBLICATIONS

Park, Jong-Il, et al., "Multispectral Imaging Using Multiplexed Illumination", International Conference on Computer Vision, Hanyang University, City of New York, Columbia University, 8 pages.
(Continued)

*Primary Examiner* — Anh Q Tran
(74) *Attorney, Agent, or Firm* — Perkins Coie LLP

(57) ABSTRACT

Introduced here are light sources for flash photography configured to produce high-fidelity white light that is tunable over a broader range of correlated color temperatures (CCTs) than conventional flash technologies. The light source can include multiple independently controllable color channels representing illuminants (e.g., light-emitting diodes) of different colors with varying degrees of saturation. Operating collectively, the multiple color channels can produce a high spectral quality white light corresponding to different CCTs (e.g., "warm" white light having a red hue, "cool" white light having a blue hue). Operating independently, these same color channels can be pre-flashed in a variety of prescribed sequences to probe the spectral characteristics of a scene, thereby allowing for an enhanced, spectrally matched white flash as well as collecting per-pixel reflectivity data that can be later used in during post processing of the captured image.

14 Claims, 25 Drawing Sheets
(18 of 25 Drawing Sheet(s) Filed in Color)

(51) Int. Cl.
- *H05B 41/14* (2006.01)
- *G06K 9/00* (2006.01)
- *H04N 5/341* (2011.01)
- *H04N 5/225* (2006.01)
- *G06K 9/66* (2006.01)
- *G03B 15/05* (2006.01)
- *H05B 33/08* (2006.01)

(52) U.S. Cl.
CPC ........... *H04N 5/341* (2013.01); *H05B 33/086* (2013.01); *H05B 33/0872* (2013.01); *G03B 2215/0503* (2013.01); *G03B 2215/0567* (2013.01); *G06K 2009/0006* (2013.01)

(56) References Cited

U.S. PATENT DOCUMENTS

| | | | |
|---|---|---|---|
| 8,340,937 B2 | 12/2012 | Skinner et al. | |
| 9,778,109 B2 | 10/2017 | Park et al. | |
| 2001/0008488 A1 | 7/2001 | Shinozaki | |
| 2006/0250519 A1* | 11/2006 | Kawakami | G03B 15/05 348/371 |
| 2008/0123949 A1 | 5/2008 | Kwon et al. | |
| 2011/0109445 A1 | 5/2011 | Weaver et al. | |
| 2011/0157245 A1 | 6/2011 | Young | |
| 2011/0282613 A1 | 11/2011 | Skinner et al. | |
| 2012/0104962 A1 | 5/2012 | Chen et al. | |
| 2012/0127334 A1 | 5/2012 | Imai | |
| 2013/0214704 A1 | 8/2013 | Gerlach et al. | |
| 2013/0235551 A1* | 9/2013 | Hamada | H04N 5/232 362/11 |
| 2014/0240587 A1 | 8/2014 | Cote et al. | |
| 2014/0293091 A1 | 10/2014 | Rhoads et al. | |
| 2016/0088278 A1* | 3/2016 | Velarde | H04N 9/735 348/371 |
| 2018/0284020 A1 | 10/2018 | Vauclin et al. | |

OTHER PUBLICATIONS

Lee et al. "Precise Dimming and Color Control of LED Systems Based on Color Mixing" IEEE Transactions on Power Electronics, Jan. 2016, 31(1):65-80.

Urban, et al., "Spectral-Based Color Separation Using Linear Regression Iteration", Wiley InterScience, <https://www.idd.tu-darmstadt.de>, Oct. 26, 2005, pp. 229-239.

* cited by examiner

| | Two-Channel Light Source | Five-Channel Light Source |
|---|---|---|
| CCT Range | Typical: 2500-5000K<br>Broadest: 2700-6000K | Typical: 1650-8000L<br>Broadest: 1100-20000K |
| Lumens | Peak: 800 (roof-shaped) | Peak: 1100 (plateau-shaped) |
| CRI (Ra/R9) | Spec: 90/50<br>Tested/Actual: 70/0 | Spec: 92-98<br>Tested/Actual: 92-98 |
| Delta UV (ΔUV) | Maximum: <0.008 | Maximum: <0.002 |
| Spectrum | Limited | Full |
| Delta E (ΔE) Color Error | 1.5-3.5 | <1 |
| Color Gamut Access | No | Yes |
| Rf | 73-88 | 95 |

1201
Illuminate ambient environment by activating illuminant(s) corresponding to a first color channel 1202
Illuminate ambient environment by activating illuminant(s) corresponding to a second color channel 1203
Illuminate ambient environment by activating illuminant(s) corresponding to a third color channel 1204
Illuminate ambient environment by activating illuminant(s) corresponding to a fourth color channel 1205
Illuminate ambient environment by activating illuminant(s) corresponding to a fifth color channel 1206
Capture a series of images in conjunction with the series of colored flashes 1207
Capture a reference image without any flash 1208
Examine data corresponding to the effect of each color channel 1209
Determine an appropriate white light formulation based on the data

1301
Illuminate ambient environment by activating illuminant(s) corresponding to all color channels except a first color channel 1302
Illuminate ambient environment by activating illuminant(s) corresponding to all color channels except a second color channel 1303
Illuminate ambient environment by activating illuminant(s) corresponding to all color channels except a third color channel 1304
Illuminate ambient environment by activating illuminant(s) corresponding to all color channels except a fourth color channel 1305
Illuminate ambient environment by activating illuminant(s) corresponding to all color channels except a fifth color channel 1306
Capture a series of images in conjunction with the series of substantially white flashes 1307
Illuminate ambient environment with a reference flash by activating illuminant(s) corresponding to all color channels 1308
Capture a reference image in conjunction with the reference flash 1309
Examine data corresponding to effect of each color channel 1310
Determine an appropriate white light formulation based on the data

1401
Image color reference object(s) in conjunction with a flash produced by built-in flash technology 1402
Image color reference object(s) in conjunction with a flash produced by five-channel light source 1403
Examine data corresponding to the first and second images to detect improvements in color reproducibility

FIGURE 14

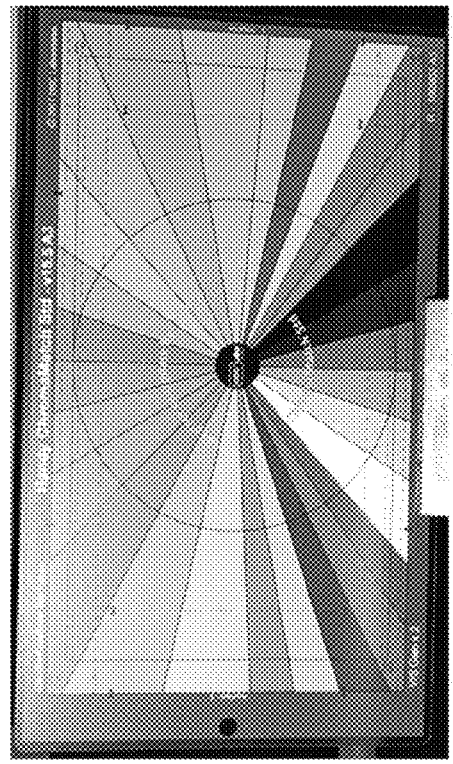
Flash From Five-Channel Light Source
R: 250
G: 208
B: 195
C: 230 (B) / 185 (G)
M: 235 (R) / 180 (B)
Y: 252 (R) / 235 (G)
White Value: R253 / G253 / B253
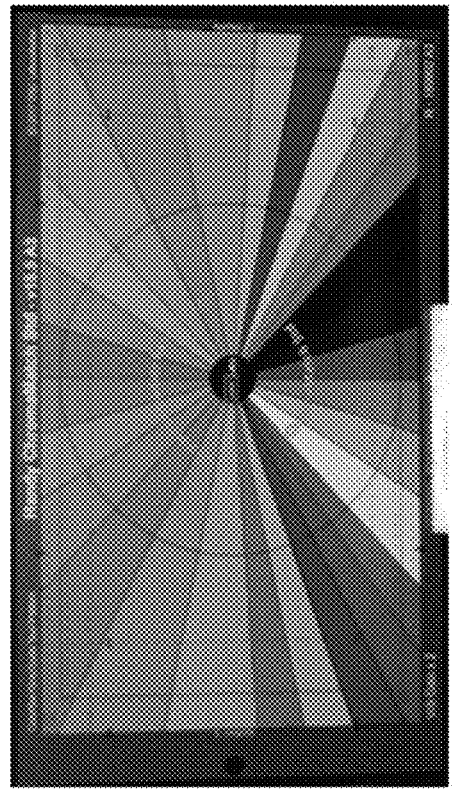
Flash From Huawei® Nexus 6P
R: 199
G: 130
B: 165
C: 230 (B) / 146 (G)
M: 207 (R) / 183 (B)
Y: 220 (R) / 201 (G)
White Value: R187 / G195 / B210
FIGURE 15

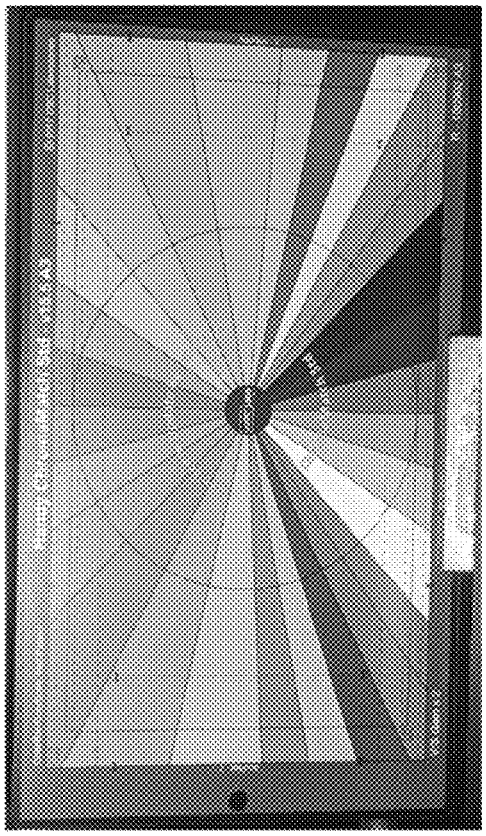
Flash From Five-Channel Light Source
R: 232
G: 182
B: 174
C: 231 (B) / 165 (G)
M: 225 (R) / 154 (B)
Y: 250 (R) / 230 (G)
White Value: R243 / G235 / B225
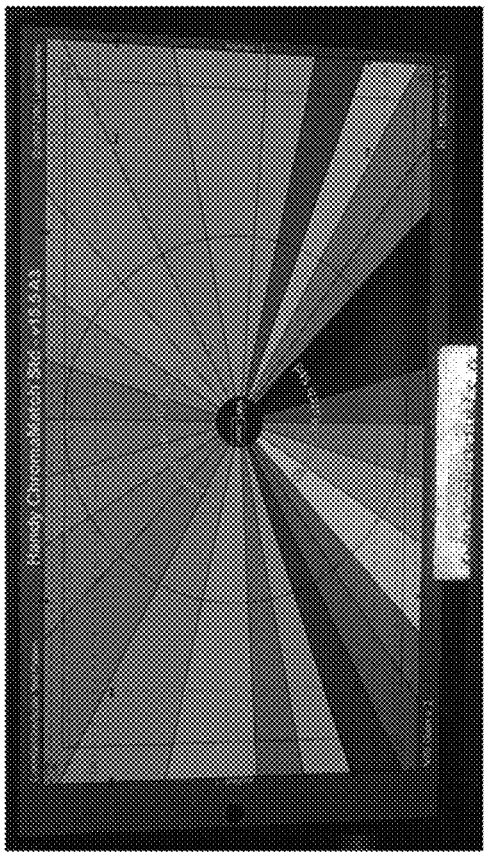
Flash From Google Pixel™
R: 230
G: 147
B: 132
C: 195 (B) / 154 (G)
M: 227 (R) / 143 (B)
Y: 221 (R) / 196 (G)
White Value: R224 / G220 / B210
FIGURE 16

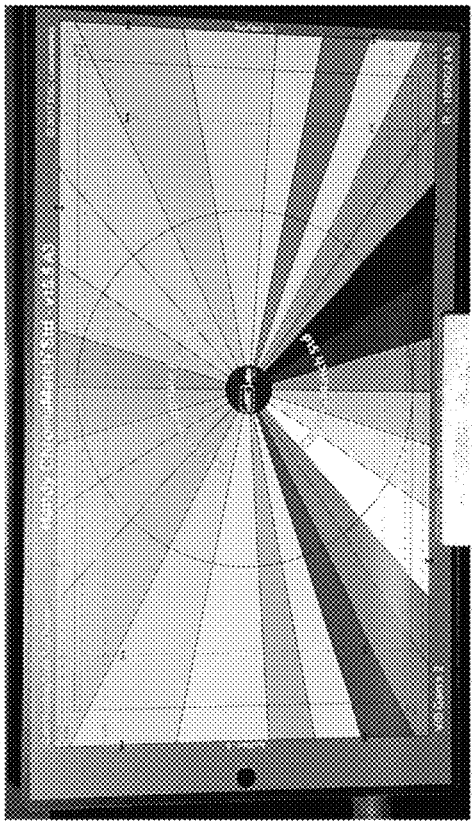
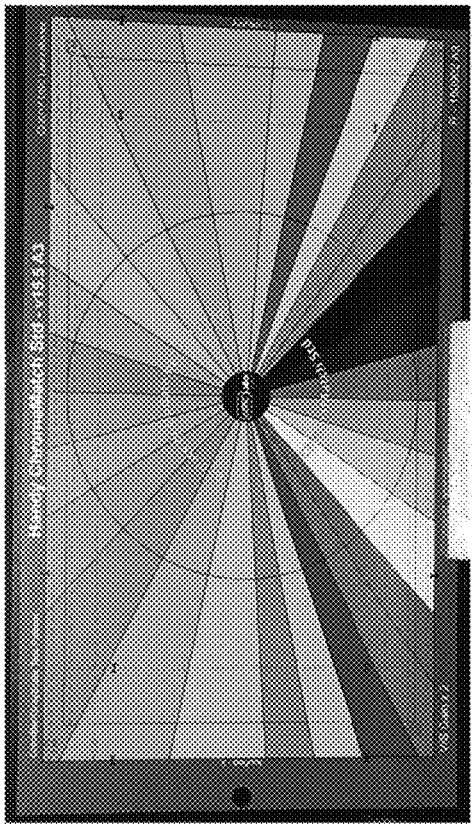
FIGURE 17

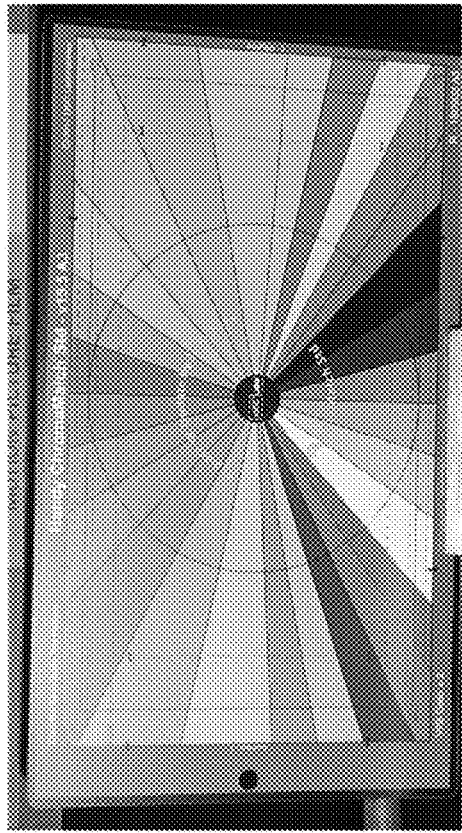
Flash From Five-Channel Light Source
R: 223
G: 200
B: 203
C: 220 (B) / 155 (G)
M: 224 (R) / 172 (B)
Y: 233 (R) / 222 (G)
White Value: R230 / G230 / B224
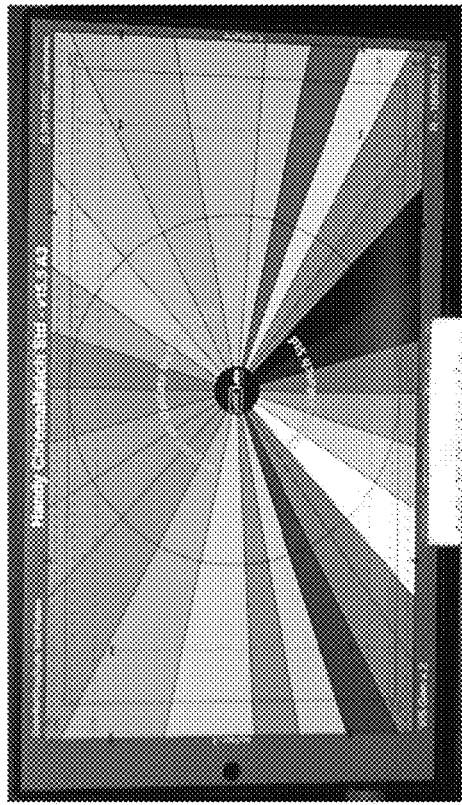
Flash From Apple iPhone® 7
R: 207
G: 167
B: 150
C: 196 (B) / 151 (G)
M: 197 (R) / 161 (B)
Y: 243 (R) / 240 (G)
White Value: R255 / G255 / B253
FIGURE 18

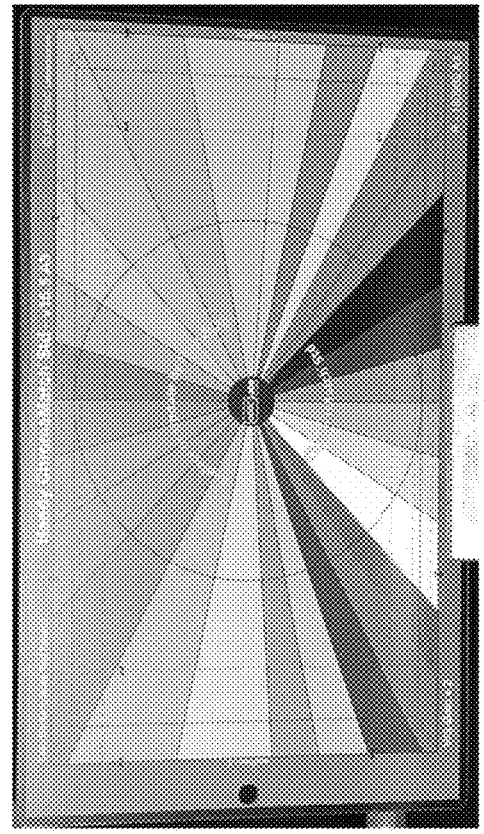
Flash From Five-Channel Light Source
R: 253
G: 211
B: 214
C: 235 (B) / 172 (G)
M: 242 (R) / 173 (B)
Y: 255 (R) / 238 (G)
White Value: R254 / G254 / B245
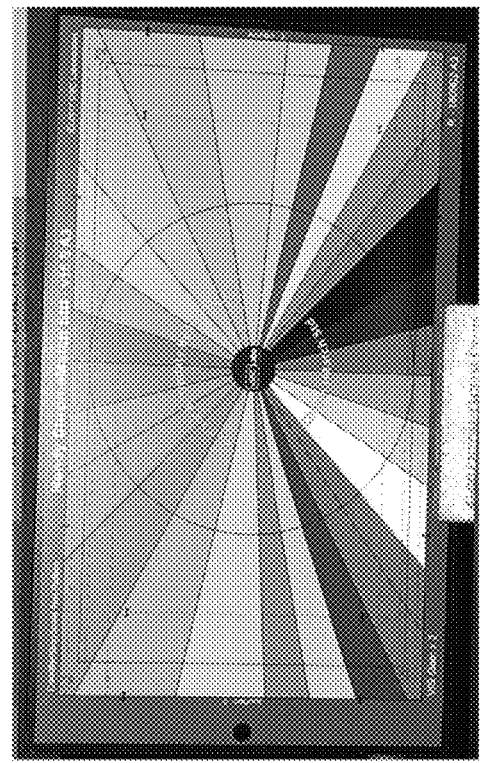
Flash From Apple iPhone® X
R: 215
G: 163
B: 153
C: 215 (B) / 155 (G)
M: 218 (R) / 174 (B)
Y: 255 (R) / 255 (G)
White Value: R255 / G255 / B255
FIGURE 19

FULL-SPECTRUM FLASH FOR ELECTRONIC DEVICES

CROSS-REFERENCE TO RELATED APPLICATIONS

This application claims priority to U.S. Provisional Application No. 62/530,244, titled "Multi-Channel Full Color Spectrum Flash for Mobile Devices" and filed on Jul. 9, 2017, which is incorporated by reference herein in its entirety.

TECHNICAL FIELD

Various embodiments concern multi-channel light sources that are tunable across a wide color gamut and capable of producing full-spectrum flash.

BACKGROUND

Traditional lighting technologies, such as incandescent bulbs and fluorescent bulbs, suffer from several drawbacks. For example, these lighting technologies do not have long lifespans or high energy efficiencies. Moreover, these lighting technologies are only offered in a limited selection of colors, and the light output by these lighting technologies generally changes over time as the source ages and begins to degrade. Consequently, light-emitting diodes (LEDs) have become an attractive option for many applications.

Many electronic devices include one or more image sensors for capturing images of the surrounding environment, such as a rear-facing camera or a front-facing camera. Each of these cameras is typically accompanied by at least one illuminant capable of providing robust luminosity across a wide field of view (FOV). Yet these illuminants are typically deficient in several respects.

For instance, LEDs embedded within electronic devices are often designed to produce a fixed white light with no tunable range. White light could be produced by combining a short-wavelength LED (e.g., one designed to produce blue light or ultraviolet light) and a yellow phosphor coating. Blue/ultraviolet photons generated by the short-wavelength LED will either travel through the phosphor layer without alteration or be converted into yellow photons in the phosphor layer. The combination of blue/ultraviolet photons and yellow photons produces white light (also referred to as "phosphor white light"). As another example, white light could be produced by a xenon flashlamp designed to produce extremely intense white light (also referred to as "xenon white light") for short durations.

When an image is captured by an electronic device under phosphor white light or xenon white light, the effect is roughly equivalent to capturing the image under a fluorescent light source. Thus, phosphor white light and xenon white light will not provide an accurately reflected color spectrum, nor will they have any vibrancy. Instead, these illuminants simply flood the ambient environment with white light so that objects can be readily identified within images.

Recent development has focused on developing light sources that include two illuminants corresponding to different correlated color temperatures (CCTs). While these light sources may be able to produce a mixed white light that more accurately matches the color of an ambient environment, they can further take away from the color quality. For example, when mixed white light drops below the Planckian locus (also referred to as the "black body locus") it may become pinkish in tone. Consequently, significant post-processing may be necessary to artificially recreate the original lighting of the ambient environment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various features of the technology will become more apparent to those skilled in the art from a study of the Detailed Description in conjunction with the drawings. Embodiments of the technology are illustrated by way of example and not limitation in the drawings, in which like references may indicate similar elements.

FIG. 11 illustrates how the five-channel light sources described herein can substantially improve in terms of color reproducibility in comparison to two-channel light sources.

FIG. 12 illustrates a process for acquiring color information that may be useful in tuning each color channel of a five-channel light source in preparation for a flash event.

FIG. 13 illustrates another process for acquiring color information that may be useful in tuning each color channel of a five-channel light source in preparation for a flash event.

FIG. 14 illustrates a process for performing a processing procedure on images captured by an electronic device.

FIG. 15 depicts a fidelity comparison between the five-channel light source and the built-in flash technology of a Huawei® Nexus 6P mobile phone.

FIG. 16 depicts a fidelity comparison between the five-channel light source and the built-in flash technology of a Google Pixel™ mobile phone.

FIG. 17 depicts a fidelity comparison between the five-channel light source and the built-in flash technology of a Samsung® Galaxy mobile phone.

FIG. 18 depicts a fidelity comparison between the five-channel light source and the built-in flash technology of an Apple iPhone® 7 mobile phone.

FIG. 19 depicts a fidelity comparison between the five-channel light source and the built-in flash technology of an Apple iPhone® X mobile phone.

Figure 1A:
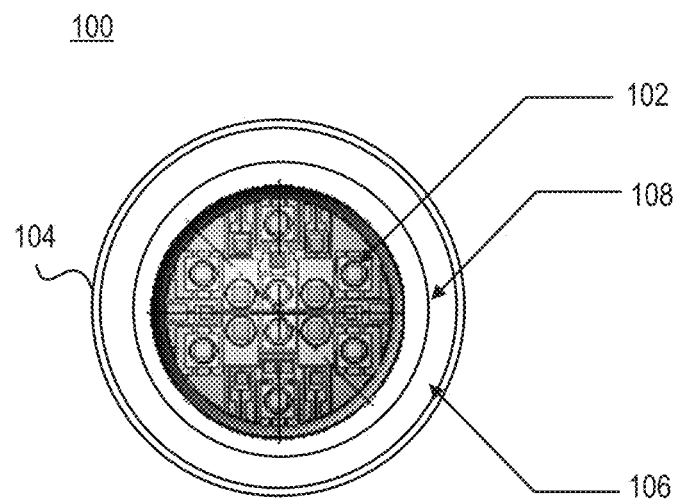
FIG. 1A depicts a top view of a multi-channel light source that includes multiple color channels that are configured to produce different colors.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

An illuminant can be characterized by its color temperature and color rendering index (CRI). The color temperature of an illuminant is the temperature at which the color of light emitted from a heated black body is matched by the color of the illuminant. For an illuminant that does not substantially emulate a black body, such as a fluorescent bulb or a light-emitting diode (LED), the correlated color temperature (CCT) of the illuminant is the temperature at which the color of light emitted from a heated black body is approximated by the color of the illuminant.

CCT can also be used to represent the chromaticity of illuminants that are configured to generate white light. Because chromaticity is a two-dimensional characterization, Duv (as defined by the American National Standards Institute (ANSI) C78.377) may be used to provide another dimension. When used with a MacAdam ellipse, CCT and Duv allow the visible color output by an illuminant to be more precisely controlled (e.g., by being tuned). The MacAdam ellipse represents all colors that are distinguishable to the human eye.

CRI, which is measured on a scale from 1-100, indicates how accurately an illuminant renders the color(s) of an illuminated object in comparison to an ideal or natural light source. If the illuminant is an LED, CRI is calculated by measuring the CRI ratings for eight different colors (i.e., R1-R8) and then averaging them out. However, the measured average fails to account for R9 (i.e., red) and R13 (i.e., skin tone), which are often useful in mixing/reproducing the other colors (e.g., to make skin tones appear more natural).

The CCT and CRI of an illuminant is typically difficult to tune, particularly in real time (e.g., as an image of a scene that is illuminated by the illuminant is captured). Further difficulty arises when trying to maintain an acceptable CRI while varying the CCT of an illuminant.

Introduced here, therefore, are multi-channel light sources configured to produce high-fidelity white light that is tunable over a broader CCT range than conventional flash technologies, such as phosphor LEDs and xenon flashlamps. A multi-channel light source includes multiple color channels corresponding to different colors, and each color channel can include one or more illuminants configured to produce a substantially similar color. One example of an illuminant is an LED.

A controller can be configured to simultaneously drive each color channel of the multiple color channels to produce a white light having a desired CCT. The controller may be configured to determine, based on a color mixing model, one or more operating parameter(s) required to achieve the desired CCT. For example, the operating parameter(s) may specify the driving current to be provided to each color channel. By varying the operating parameter(s), the controller can tune the CCT of the white light as necessary. Accordingly, the multi-channel light source can produce white lights corresponding to different CCTs (e.g., "warm" white light having a red hue, "cool" white light having a blue hue). White light produced by these multi-channel light sources can improve the quality of images taken in the context of consumer photography, prosumer photography, professional photography, etc.

A multi-channel light source can include, for example, five strategically selected, saturated color channels that synergistically overlap across the visible range.

When these color channels are combined, the multi-channel light source can exhibit several advantages including:

The ability to reproduce nearly all real white lights, both natural and artificial, to a level yielding near-zero color distortion (e.g., $\Delta E<1$) for an arbitrary multi-channel image sensor. Near-zero color distortion can be achieved for all real colors from grays to fully saturated colors. CCT, tint, spectral profile, and response profile of the multi-channel image sensor may all be integral to the illuminance spectrum.

The ability to produce significantly greater illumination per strobe aperture/die area than conventional multi-channel white light sources and monochromatic light sources due to greater die area utilization.

The ability to eliminate perceptible irreversible metamerisms introduced after standard chromatic adaptations of images captured in conjunction with light produced by state-of-the-art strobes with fully known spectra.

The ability to provide a universal strobe with relaxed color channel binning requirements compared to conventional white strobes. A "universal" strobe may be able to readily adapt to multi-channel image sensor response variations.

When these color channels are strobed in concert with a multi-channel image sensor (e.g., an RGB camera sensor), the multi-channel light source can exhibit several advantages including:

The ability to precisely reveal the universal visible-range spectral reflectivity profile of all illuminated surfaces on a per-pixel basis. Said another way, underlying surface reflectivity can be revealed rather than simply the apparent color (e.g., in an RGB sense).

Per-pixel reflectivity in turn enables:
  Spectral identification of scene illuminant;
  Identification of arbitrary multiple scene illuminants (e.g., an indoor source and an outdoor source via a window, scene-influenced illuminant tints, etc.);
  Pixel-level illuminant spectrum identification;
  True color of each pixel under any known illuminant, rather than just the apparent pixel color; and
  Non-perceptible error chromatic adaptation for all colors.
Accordingly, the multi-channel light source also provides:
  The ability to perfectly re-cast strobe-lit portions of a scene as if lit by native scene lighting spectra and relative intensities as the scene appears to the human eye. This results in "lifting" otherwise dark, noisy, or blurry images to be sufficiently lit, non-noisy, or non-blurry, yet have the appearance of no flash.
  An accurate-to-human-perception color re-casting of arbitrary multi-illuminant scenes.
  A controllable strobe able to provide image enhancement. As such, the multi-channel light source can be more ubiquitously employed than conventional flash technologies with inferior results.
  Computer software (e.g., mobile application) utility. For example, an individual may be able to modify/monitor spectral reflective level (e.g., by matching the color of a painted surface, section of fabric, etc.) to match color across a broad color gamut, spectral assessments, image sensor response profiles, etc.

Embodiments may be described with reference to particular electronic devices or illuminants. For example, the technology may be described in the context of mobile phones that include a multi-channel light source having LEDs of several different colors. However, those skilled in the art will recognize that these features are equally applicable to other types of electronic devices and illuminants.

Moreover, the technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a light source to perform a process for controllably producing white light (e.g., in the form of a flash) having a high gamut area by mixing the colored light produced by multiple color channels.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, objects may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program stored in a memory accessible to a multi-channel light source may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Light Source Overview

FIG. 1A depicts a top view of a multi-channel light source 100 that includes multiple color channels that are configured to produce different colors. Each color channel can include one or more illuminants 102 of a substantially similar color. For example, the multi-channel light source 100 may include a single illuminant configured to produce a first color, multiple illuminants configured to produce a second color, etc. Note that, for the purpose of simplification, a color channel may be said to have "an illuminant" regardless of how many separate illuminants the color channel includes.

One example of an illuminant is an LED. An LED is a two-lead illuminant that is generally comprised of an inorganic semiconductor material. While embodiments may be described in the context of LEDs, the technology is equally applicable to other types of illuminant. Table I includes several examples of available colors of LEDs, as well as the corresponding wavelength range, voltage drop, and semiconductor material(s).

TABLE I

Range (in nanometers) in which the dominant wavelength resides, voltage drop, and representative materials for available colors of LEDs.

| Color | Dominant Wavelength | Representative Materials |
| --- | --- | --- |
| Infrared | $\lambda > 760$ | Gallium arsenide; and Aluminum gallium arsenide |
| Red | $610 < \lambda < 760$ | Aluminum gallium arsenide; Gallium arsenide phosphide; Aluminum gallium indium phosphide; and Gallium(III) phosphide |
| Orange | $590 < \lambda < 610$ | Gallium arsenide phosphide; Aluminum gallium indium phosphide; and Gallium(III) phosphide |
| Yellow | $570 < \lambda < 590$ | Gallium arsenide phosphide; Aluminum gallium indium phosphide; and Gallium(III) phosphide |
| Green | $500 < \lambda < 570$ | Aluminum gallium phosphide; Aluminum gallium indium phosphide; Gallium(III) phosphide; Indium gallium nitride; and Gallium(III) nitride |

TABLE I-continued

Range (in nanometers) in which the dominant wavelength resides, voltage drop, and representative materials for available colors of LEDs.

| Color | Dominant Wavelength | Representative Materials |
|---|---|---|
| Blue | 450 < λ <500 | Zinc selenide; and Indium gallium nitride |
| Violet | 400 < λ <450 | Indium gallium nitride |
| Ultraviolet | λ < 400 | Indium gallium nitride; Diamond; Boron nitride; Aluminum nitride; Aluminum gallium nitride; and Aluminum gallium indium nitride |

Other colors not shown in Table I may also be incorporated into the light source 100. Examples of such colors include cyan (490<λ<515), lime (560<λ<575), amber (580<λ<590), and indigo (425<λ<450). Those skilled in the art will recognize that these wavelength ranges are simply included for the purpose of illustration.

As noted above, a multi-channel light source 100 includes multiple color channels that are configured to produce different colors. For example, the light source 100 may include three separate color channels configured to produce blue light, green light, and red light. Such light sources may be referred to as "RGB light sources." As another example, the light source 100 may include four separate color channels configured to produce blue light, green light, red light, and either amber light or white light. Such light sources may be referred to as "RGBA light sources" or "RGBW light sources." As another example, the light source 100 may include five separate color channels configured to produce blue light, cyan light, lime light, amber light, and red light. As another example, the light source 100 may include seven separate color channels configured to produce blue light, cyan light, green light, amber light, red light, violet light, and white light. Thus, the light source 100 could include three channels, four channels, five channels, seven channels, etc.

While three-channel light sources and four-channel light sources improve upon conventional flash technologies, they may have a lumpy spectral distribution or narrow range of high fidelity. Consequently, the multi-channel light source 100 will often include at least five different color channels. As the number of color channels increases, the light quality, CCT range, and quality over range will also generally increase. For example, a five-channel light source having properly selected illuminants can be designed to deliver full-spectrum white light over a broad CCT range (e.g., from 1650K to over 10000K) with CRI/R9 values greater than 90 (e.g., with a typical Ra average value of 94) at ΔuV of ±0.002. Multi-channel light sources able to a color error of less than one (i.e., ΔE<1) may be referred to as "high-fidelity light sources." Gradients of color could also be added to match the tint of a scene.

Figure 2:
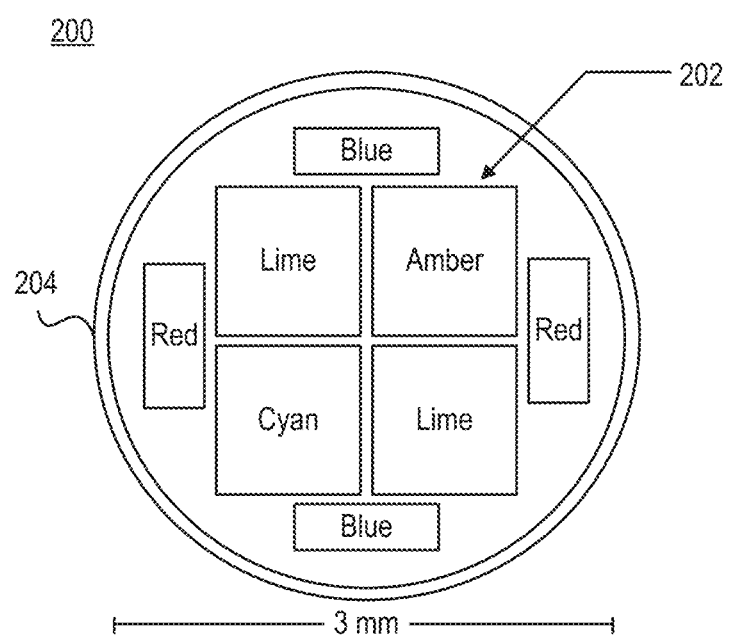
FIG. 2 depicts an example of an array of illuminants (here, light-emitting diodes).

Due to their low heat production, LEDs can be located close together. Thus, if the illuminants 102 of the multi-channel light source are LEDs, then the light source 100 may include an array comprised of multiple dies placed arbitrarily close together. Note, however, that the placement may be limited by "whitewall" space between adjacent dies. The whitewall space is generally on the order of approximately 0.1 millimeters (mm), though it may be limited (e.g., no more than 0.2 mm) based on the desired diameter of the light source 100 as a whole. In FIG. 2, for example, the array includes eight dies associated with five different colors Such an array may be sized to fit within similar dimensions as conventional flash technology. The array may also be based on standard production die(s) requiring, for example, a 2-1-1-0.5-0.5 area ratio of lime-amber-cyan-red-blue. The array may be driven by one or more linear field-effect transistor-based (FET-based) current-regulated drivers. In some embodiments, each color channel is configured to be driven by a corresponding driver. These drivers may be affixed to, or embedded within, a substrate 104 arranged beneath the illuminants 102.

By controllably driving each color channel on an individual basis, the multi-channel light source 100 can produce white light at different CCTs. For example, the multi-channel light source 100 may produce a high-fidelity flash in conjunction with the capture of an image by an electronic device. Said another way, the light source 100 may generate a high-fidelity flash to illuminate the scene being photographed by an electronic device. Examples of electronic devices include mobile phones, tablet computers, digital cameras (e.g., single-lens reflex (SLR) cameras, digital SLR (DSLR) cameras, and light-field cameras, which may also be referred to as "plenoptic cameras"), etc. White light produced by the multi-channel light source 100 can improve the quality of images taken in the context of consumer photography, prosumer photography, professional photography, etc.

Although the illuminants 102 are illustrated as an array of LEDs positioned on a substrate 104, other arrangements are also possible. In some cases, a different arrangement may be preferred (e.g., due to thermal constraints, size constraints, color mixing constraints, etc.). For example, the multi-channel light source 100 may include a circular arrangement, grid arrangement, or cluster of LEDs.

In some embodiments, the multi-channel light source 100 is communicatively coupled to an optical sensor (e.g., a photodiode) configured to generate optical feedback indicative of the brightness level of each color channel. For example, the multi-channel light source 100 may include multiple optical sensors corresponding to different bandwidths. In such embodiments, the optical feedback may specify multiple light intensities corresponding to optical sensors designed to examine different bandwidths, thereby allowing color shift in a color channel to be readily discovered. As another example, the light source 100 may include multiple optical sensors, and each optical sensor may be configured to measure the brightness of a corresponding color channel. The optical sensor(s) may be arranged along the upper surface of the substrate 104.

The multi-channel light source 100 may also include a heat sensor (e.g., a thermistor) configured to measure thermal feedback. The heat sensor may measure thermal feedback periodically to determine whether the operating temperature of the LED's aging has affected the output of the illuminants 102. Similar to the optical sensor(s), the heat sensor may be arranged along the upper surface of the substrate 104.

A multivariate state estimator may be responsible for thermal management of the multi-channel light source 100 may be executed by a controller (e.g., a processor) that is communicatively coupled to the multi-channel light source 100. Proper thermal management may be critical for flash events due to their dynamic nature. In some embodiments the multivariate state estimator resides within a memory of the multi-channel light source 100, while in other embodiments the multivariate state estimator resides within a memory of an electronic device that is communicatively coupled to the multi-channel light source 100. As further described below, in some embodiments the multi-channel light source 100 resides within the electronic device, while in other embodiments the multi-channel light source is connected to the electronic device across a network. The multivariate state estimator may be configured to estimate the thermal state of the light source 100 based on thermal interactions of the ambient temperature and adjacent die.

An empirical solver module (also referred to as a "characterization module" or a "fast inverse solver") can also be configured to characterize light emitted by the light source 100. The characterization module can implement the processes (e.g., the inverse solver algorithm) described in U.S. application Ser. No. 15/425,467, which is incorporated by reference herein in its entirety. Thus, the characterization module may be configured to determine, based on a reference set of curves corresponding to different combinations of operating conditions (e.g., driving current and flux), an appropriate brightness and color point(s) necessary to achieve a particular color model corresponding to a particular CCT.

Figure 1B:
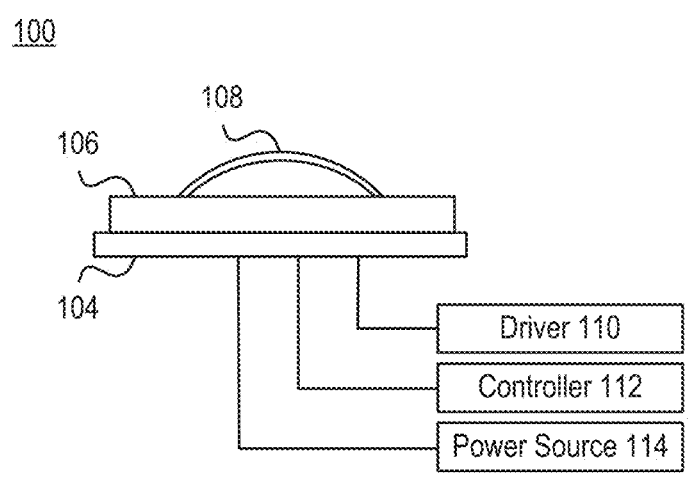
FIG. 1B depicts a side view of the multi-channel light source illustrating how, in some embodiments, the illuminants can reside within a housing.

FIG. 1B depicts a side view of the multi-channel light source 100 illustrating how, in some embodiments, the illuminants 102 can reside within a housing. The housing can include a base plate 106 that surrounds the illuminants 102 and/or a protective surface 108 that covers the illuminants 102. While the protective surface 108 shown here is in the form of a dome, those skilled in the art will recognize that other designs are possible. For example, the protective surface 108 may instead be arranged in parallel relation to the substrate 104. Moreover, the protective surface 108 may be designed such that, when the multi-channel light source 100 is secured within an electronic device, the upper surface of the protective surface 108 is substantially co-planar with the exterior surface of the electronic device. The protective substrate 108 can be comprised of a material that is substantially transparent, such as glass, plastic, etc.

The substrate 104 can be comprised of any material able to suitably dissipate heat generated by the illuminants 102. A non-metal substrate, such as one comprised of woven fiberglass cloth with an epoxy resin binder (e.g., FR4), may be used to reduce/eliminate the problems associated with metal substrates. For example, a substrate 104 composed of FR4 can more efficiently dissipate the heat generated by multiple color channels without experiencing the heat retention issues typically encountered by metal substrates. Note, however, that some non-metal substrates can only be used in combination with mid-power illuminants (i.e., rather than high-power illuminants). High-power illuminants (e.g., those useful for producing flashes in the context of photography) may instead be mounted on a substrate 104 comprised of metal, ceramic, etc.

The processing components necessary for operating the illuminants 102 may be physically decoupled from the light source 100. For example, the processing components may be connected to the illuminants 102 via conductive wires running through the substrate 104. Examples of processing components include drivers 110, controllers 112 (e.g., processors), power sources 114 (e.g., batteries), etc. Consequently, the processing components need not be located within the light source 100. Instead, the processing components may be located elsewhere within the electronic device within which the light source 100 is installed. Additional information on the decoupling of processing components from a light source can be found in U.S. application Ser. No. 15/382,575, which is incorporated by reference herein in its entirety.

As noted above, the multi-channel light source 100 may be designed to operate in conjunction with an image sensor. An image sensor is a sensor that detects information that constitutes an image. Generally, an image sensor does so by converting the variable attenuation of light waves (e.g., as they pass through or reflect off of objects) into electrical signals, which represent small bursts of current that convey the information. Examples of image sensors include semiconductor-charge-coupled devices (CCDs) and complementary metal-oxide-semiconductor sensors (CMOS) sensors. Both types of image sensor accomplish the same task (i.e., capture light and convert it into electrical signals). However, because CMOS sensors are generally cheaper, smaller, and consume less power than CCDs, many electronic devices (e.g., mobile phones) use CMOS sensors for image capture.

Figure 1C:
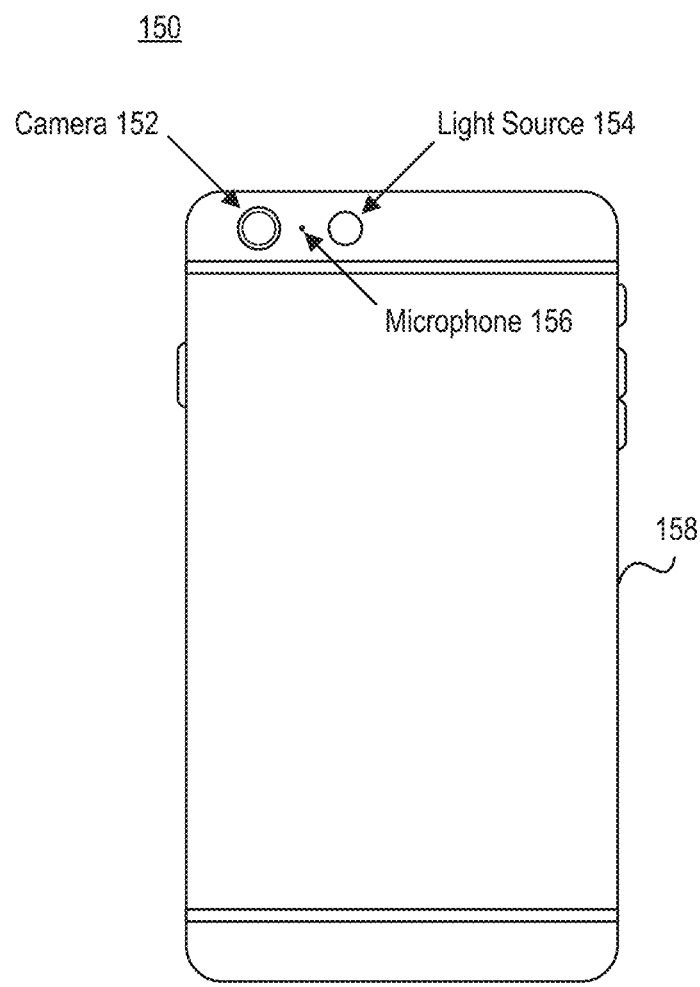
FIG. 1C depicts an electronic device that includes a rear-facing camera and a multi-channel light source configured to illuminate the ambient environment.

Accordingly, the multi-channel light source 100 could be configured to generate a flash responsive to determining that an image sensor has received an instruction to capture an image of a scene. The instruction may be created responsive to receiving input indicative of user input requesting that the image be captured. As shown in FIG. 1C, an image sensor (here, a camera 152) may be housed within the same electronic device as a multi-channel light source. The user input may be in the form of tactile input provided along the surface of a touch-sensitive display or a mechanical button accessible along the exterior of the electronic device.

In some embodiments, the multi-channel light source is designed such that it can be readily installed within the housing of an electronic device. FIG. 1C depicts an electronic device 150 that includes a rear-facing camera 152 and a multi-channel light source 154 configured to illuminate the ambient environment. The multi-channel light source 154 may be, for example, the multi-channel light source 100 of FIGS. 1A-B. The rear-facing camera 152 is one example of an image sensor that may be configured to capture images in conjunction with light produced by the light source 100. Here, the electronic device 150 is a mobile phone. However, those skilled in the art will recognize that the technology described herein could be readily adapted for other types of electronic devices, such as tablet computers and digital cameras.

The camera 152 is typically one of multiple image sensors included in the electronic device 150. For example, the electronic device 100 may include a front-facing camera that allows an individual to capture still images or video while looking at the display. The rear-facing and front-facing cameras can be, and often are, different types of image sensors that are intended for different uses. For example, the image sensors may be capable of capturing images having different resolutions. As another example, the image sensors could be paired with different light sources (e.g., the rear-facing camera may be associated with a stronger flash than the front-facing camera, or the rear-facing camera may be disposed in proximity to a multi-channel light source while the front-facing camera is disposed in proximity to a single-channel light source).

Other components may also be disposed along the exterior of the housing 158 of the electronic device 150. For example, a microphone 156 can be configured to generate audio data when other actions are performed (e.g., an image is captured, a call is placed, etc.). The audio data may be used for noise cancellation purposes (e.g., to reduce ambient noise in video media generated by the camera 152).

FIG. 2 depicts an example of an array 200 of illuminants 202. If the illuminants 202 are LEDs, the array 200 may be produced using standard dies (also referred to as "chips"). A die is a small block of semiconducting material on which the diode is located. Typically, diodes corresponding to a given color are produced in large batches on a single wafer (e.g., comprised of electronic-grade silicon, gallium arsenide, etc.), and the wafer is then cut ("diced") into many pieces, each of which includes a single diode. Each of these pieces may be referred to as a "die."

As shown in FIG. 2, the array 200 includes multiple color channels configured to produce light of different colors. Here, for example, the array 200 includes five color channels (i.e., blue, cyan, lime, amber, and red). Each color channel can include one or more illuminants. Here, for example, three color channels (i.e., blue, lime, and red) include multiple illuminants, while two color channels (i.e., cyan and amber) include a single illuminant. The number of illuminants in each color channel, as well as the arrangement of these illuminates within the array 200, may vary based on the desired output characteristics, such as maximum CCT, minimum CCT, maximum temperature, etc.

The array 200 is generally capable of producing light greater than 1,000 lumens, though some embodiments are designed to produce light less than 1,000 lumens (e.g., 700-800 lumens during a flash event). In some embodiments, the illuminants 202 are positioned in the array 200 in a highly symmetrical pattern to improve spatial color uniformity. For example, when the array 200 is designed to produce white light through simultaneous driving of the multiple color channels, the illuminants corresponding to those color channels may be arranged symmetrically to facilitate mixing of the colored light.

The array 200 may be designed such that it can be installed within the housing of an electronic device (e.g., electronic device 150 of FIG. 1C) in addition to, or instead of, a conventional flash component. For example, some arrays designed for installation within mobile phones are less than 4 mm in diameter, while other arrays designed for installation within mobile phones are less than 3 mm in diameter. The array 200 may also be less than 1 mm in height. In some embodiments, the total estimated area necessary for the array may be less than 3 mm$^2$ prior to installation and less than 6 mm$^2$ after installation. Such a design enables the array 200 to be positioned within a mobile phone without requiring significant repositioning of components within the mobile phone. One advantage of designing such a compact array of dies is that it can achieve good color mixing and adequate field of view (FOV) without the use of a collimator, diffuser, or lens.

In some embodiments, the array 200 is positioned beneath a diffuser designed to ensure proper color mixing. In other embodiments, the array 200 is positioned within a collimator 204 (also referred to as a "mixing pipe") designed to ensure proper spatial color uniformity of light produced by the illuminants 202. The collimator 204 may also be designed to promote uniform color mixing and control the FOV of light emitted by the array 200. The collimator 204 can be comprised of an inflexible material (e.g., glass) or a flexible material (e.g., silicone). The collimator 204 may be in the form of a tubular body. In some embodiments the egress aperture of the tubular body is narrower than the array (e.g., the egress aperture may have a diameter of 2.5 mm, 3 mm, or 3.5 mm), while in other embodiments the egress aperture of the tubular body is wider than the array (e.g., the egress aperture may have a diameter of 4.5 mm, 5 mm, or 5.5 mm). Thus, the tubular body may have a sloped inner surface that either focuses or disperses light produced by the illuminants 202.

The array 200 may be used instead of, or in addition to, conventional flash technologies that are configured to generate a flash in conjunction with the capture of an image. Thus, an electronic device (e.g., electronic device 150 of FIG. 1C) may include a single-channel light source and/or a multi-channel light source.

Application to Flash Events

Technologies for virtually binning illuminants, as well as using thermal/optical feedback mechanisms for tuning illuminants, have created an opportunity to use multi-channel, full-spectrum light sources to create the white light necessary for a flash event. Additional information on thermal/optical feedback mechanisms can be found in U.S. application Ser. No. 15/382,578, which is incorporated by reference herein in its entirety. Additional information on provisioning color mixing models can be found in U.S. application Ser. No. 15/609,619, which is incorporated by reference herein in its entirety.

Moreover, the improved geometries of illuminants (e.g., colored diodes) and dies on which these illuminants are located have permitted the assembly of light sources that include multiple color channels. Such advancements permit the construction of multi-channel, addressable arrays capable of fitting within the space presently allocated to the conventional flash component in electronic devices. Such a design can offer the possibility of professional-level output (also referred to as "stage-lighting-quality output") at over 1,000 lumens in an array having a diameter of approximately 3-4 mm. Moreover, such a design can offer the ability to provide broad-spectrum flashes while also providing the benefits of having individually addressable color channels in the gamut area.

In comparison to convention flash technologies, the multi-channel light sources described herein offer several benefits, including:

A true color match (i.e., ΔE of less than one) over a broad CCT range (e.g., from 1650K to over 10000K). ΔE (also referred to as the "color error" or the "unity error") is a measure of change in visual perception between two colors. ΔE values of less than one are not perceptible to the human eye.

Minimal Duv error (e.g., ΔuV<0.002).

A higher, flatter flux over the broad CCT range.

A higher flux-to-aperture ratio.

A lower peak power draw.

Access to a wider color gamut than other technologies.

Figure 3A:
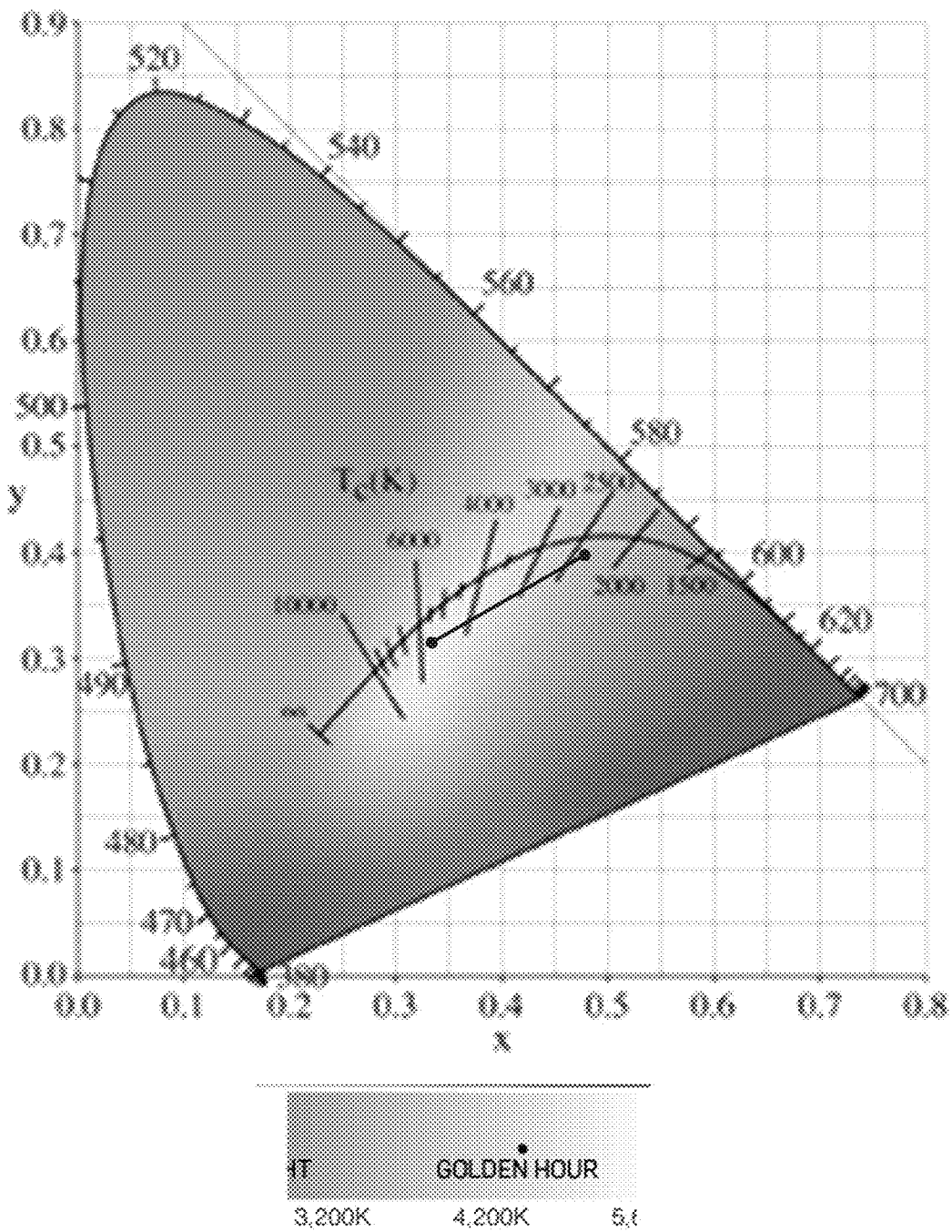
FIG. 3A illustrates the tunable range of a two-channel light source in comparison to the Planckian locus (also referred to as the "black body locus").

FIG. 3A illustrates the tunable range of a two-channel light source in comparison to the Planckian locus (also referred to as the "black body locus"). The tunable range of two-channel light sources are typically narrow. For example, the tunable range of a two-channel light source will often be approximately 2500-5000K, though it may expand to 2700-6500K at its broadest. As shown in FIG. 3A, the light path between the two color channels is substantially linear. The largest Duv, meanwhile, is in the middle of the tunable range.

Figure 3B:
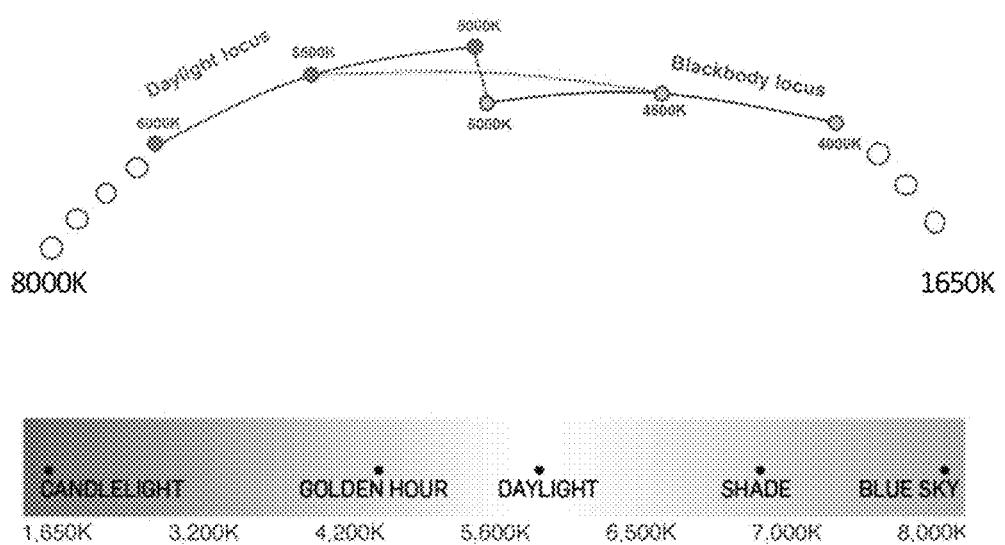
FIG. 3B illustrates the tunable range of a five-channel light source.

FIG. 3B illustrates the tunable range of a five-channel light source. The tunable range of the five-channel light source is much larger than the tunable range of the two-channel light source. Here, for example, the tunable range is approximately 1650-8000K, though it may be optimized to an even wider range for flash events. Rather than "walk" a linear path, the light path can instead walk along the Planckian locus to approximately 4500K and then follow the daylight locus to approximately 8000K. Consequently, the five-channel light source can more accurately reproduce both "warm" white lights having reddish hues (e.g., those intended to mimic candlelight, sunsets, etc.) and "cool" white lights having bluish hues (e.g., those intended to mimic blue sky, shade, etc.).

While embodiments may be described in the context of five-channel light sources, those skilled in the art will recognize that the technology is equally applicable to three-channel light sources, four-channel light sources, seven-channel light sources, etc. As the number of color channels increases, the ability of the light source to accurately produce a desired CCT will also generally increase. Thus, a seven-channel light source may be able to more accurately produce a given CCT than a five-channel light source or a three-channel light source, though the additional design complexities and illuminant cost may not necessarily be worthwhile. For example, because a five-channel light source can achieve a ΔE of less than one, additional color channels will often not be useful or noticeable. As the number of color channels increases, the total tunable range of the light source may also generally increase.

Figure 4:
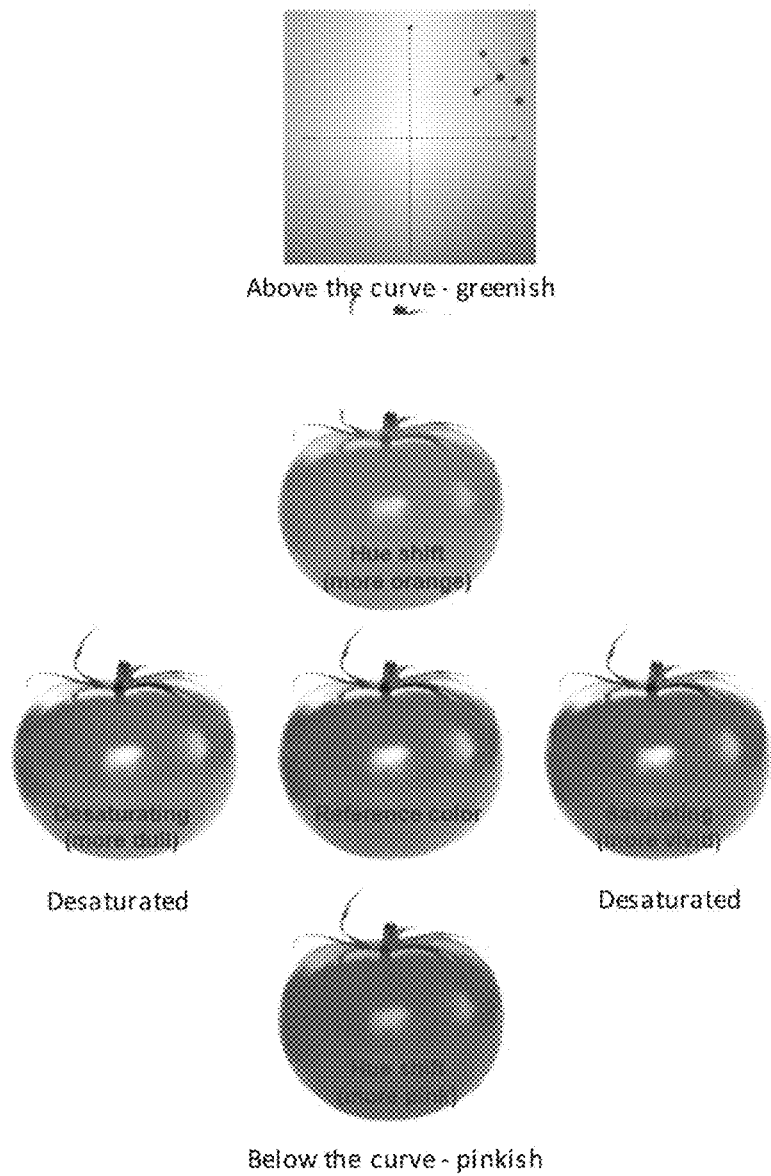
FIG. 4 illustrates the visual impact of Duv on images captured in conjunction with flashes of white light produced by a two-channel light source and a five-channel light source.

FIG. 4 illustrates the visual impact of Duv on images captured in conjunction with flashes of white light produced by a two-channel light source and a five-channel light source. As noted above, Duv may be used to describe the distance from the Planckian locus when examining the chromaticity of white light.

For the two-channel light sources shown here, Duv is approximately 0.008 in the middle of the tuning range (though the actual value will depend on the CCTs of the two channels). For context, Duv values greater than approximately 0.002 are usually detectable. Phosphor-converted white light having low CRI will also typically result in desaturation. The tomatoes on the left and bottom of FIG. 4 were captured in conjunction with a two-channel light source. The tomato on the left has become visibly desaturated (also referred to as the "dullness" of an image), while the tomato on the bottom has become visibly discolored due to a hue shift.

For five-channel light sources, Duv will consistently be below 0.002. Five-channel light sources minimize Duv by traversing either the Planckian locus or the daylight locus across the entire tunable range. The tomato in the middle of FIG. 4 was captured in conjunction with a five-channel light source.

Because each channel of a five-channel light source can be separately driven (e.g., by a controller), various image characteristics can be modified in real time. For example, the five-channel light source may produce white light that increases saturation to produce more vibrant colors, as shown by the tomato on the right of FIG. 4. As another example, the five-channel light source may produce white light that shifts hue, as shown by the tomatoes on the top and bottom of FIG. 4. Thus, a five-channel light source can illuminate an ambient environment so that object(s) are imaged as they naturally appear to the human eye, as well as provide an option to intentionally produce discoloration (e.g., by altering saturation, hue, etc.).

Figure 5:
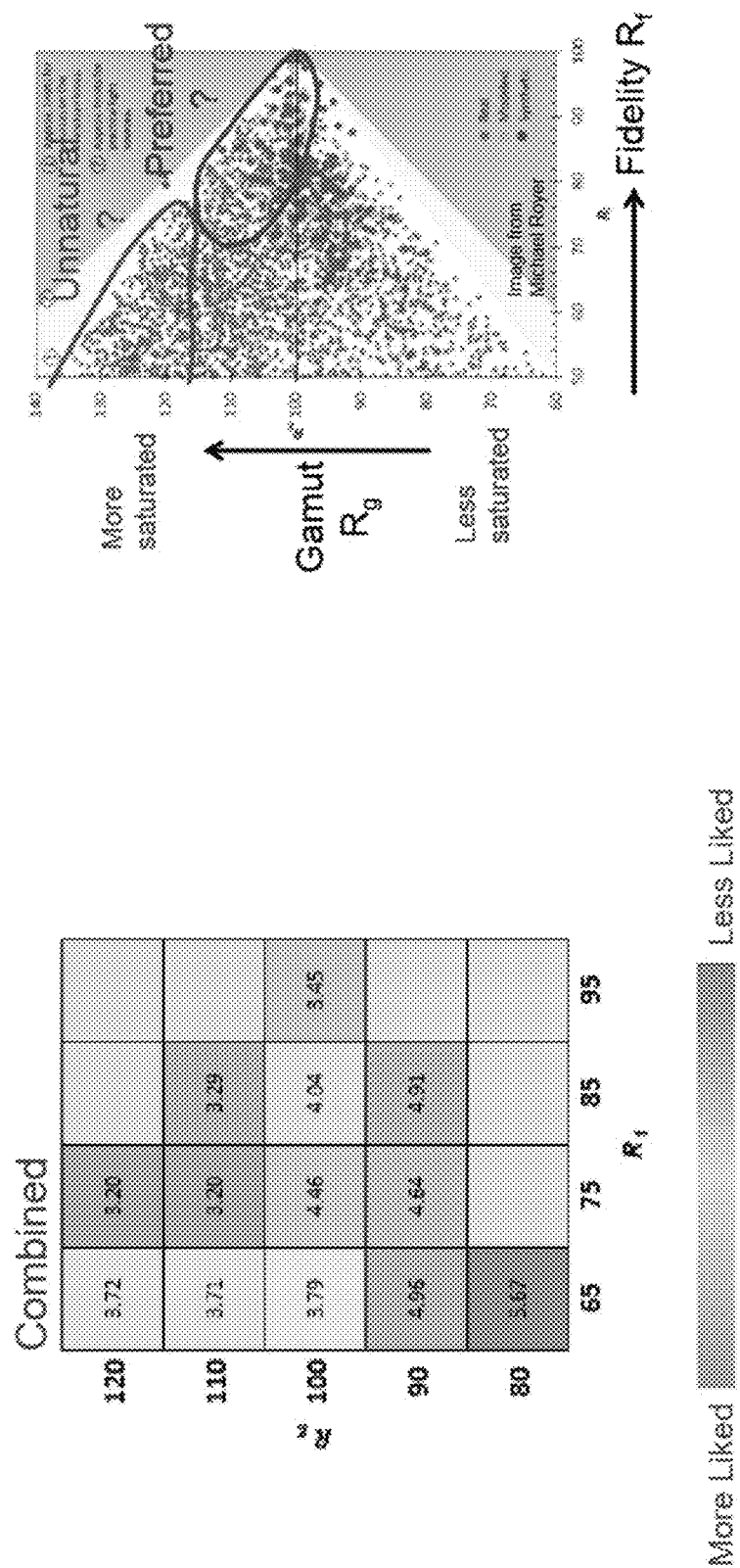
FIG. 5 illustrates how the human eye of an average individual will generally recognize improvements in color reproducibility (i.e., as measured in terms of $R_f$ and $R_g$ values).

FIG. 5 illustrates how the human eye of an average individual will generally recognize improvements in color reproducibility (i.e., as measured in terms of $R_f$ and $R_g$ values). Moreover, as shown here, many individuals prefer high-fidelity white light corresponding to a red-enhanced gamut. Such light may be referred to as "warm" white light. The multi-channel light sources described herein can be configured to produce "warm" white light during a flash event, as well as enable flash characteristics to be readily modified (e.g., in real time or during post-processing). For example, the source controller may vary the current driving each color channel to produce a modified white light that results in decreased saturation so that image(s) in conjunction with the modified white light will fall within the preferred segment of the spectrum shown in FIG. 5.

Figure 6A:
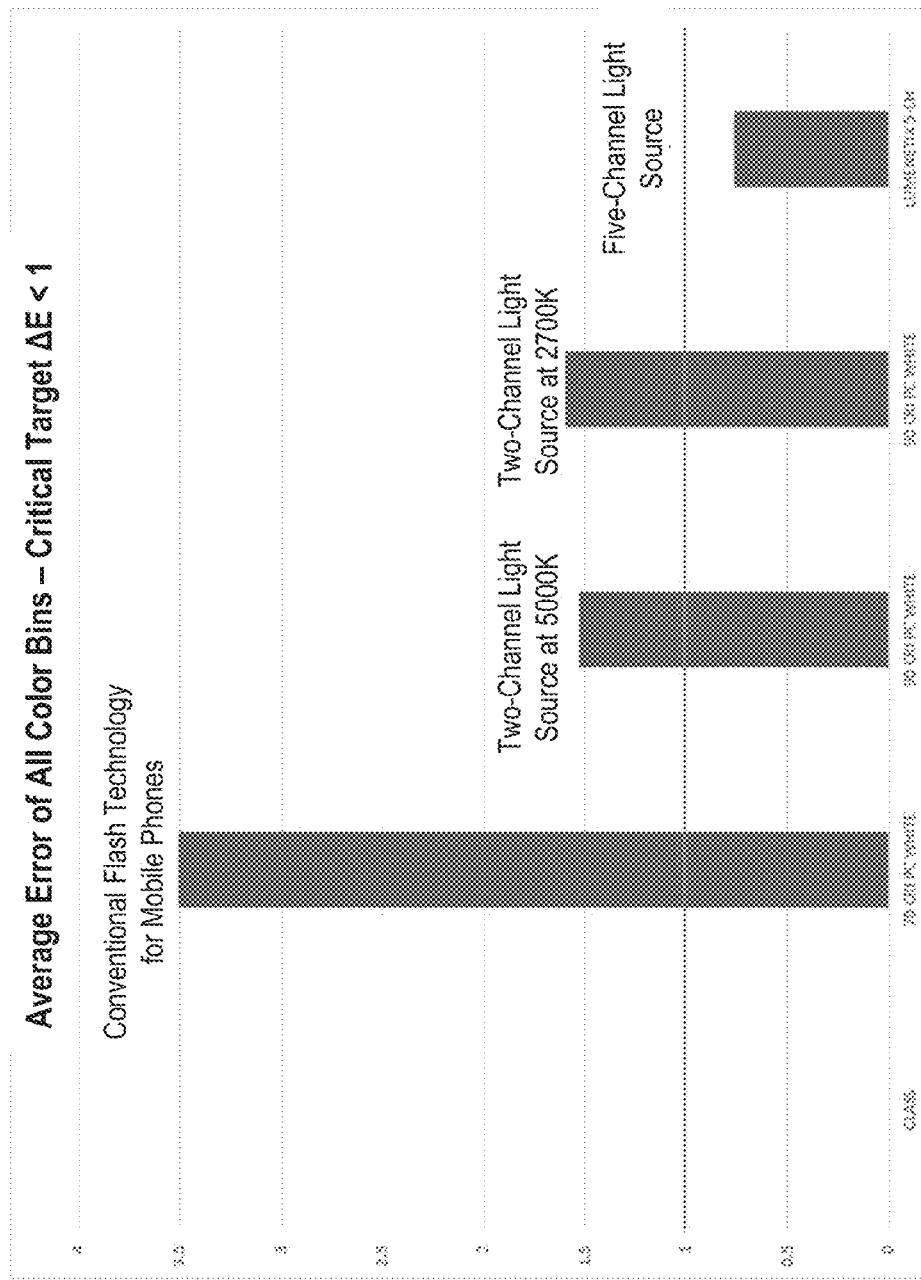
FIG. 6A depicts average ΔE of all color bins for four different types of light source: conventional flash technology for mobile phones; a two-channel light source at 5000K; a two-channel light source at 2700K; and a five-channel light source as described herein.

FIG. 6A depicts average ΔE of all color bins for four different types of light source: conventional flash technology for mobile phones; a two-channel light source at 5000K; a two-channel light source at 2700K; and a five-channel light source as described herein. Based on the Illuminating Engineering Society (IES) Technical Memorandum (TM) 30-15, ΔE results in a loss of image color information that is not recoverable (e.g., through post-processing). Ideally, ΔE (also referred to as "color error" or "unity error") from an illuminant should be less than one. When comparison of two colors results in a ΔE value of less than one, the two colors are not distinguishable by the human eye.

As shown in FIG. 6A, the five-channel light sources described herein can consistently achieve a ΔE of significantly less than one (e.g., generally about 0.6-0.7). Accordingly, images captured in conjunction with a flash produced by a five-channel light source will more accurately reflect the actual colors of objects in the captured scene.

Two-channel, three-channel, and four-channel light sources can also improve upon conventional flash technologies. While these light sources will have better color rendering properties than conventional flash technologies, they typically cannot achieve a ΔE of less than one. Consequently, light sources having at least five color channels may be preferred in some instances.

Figure 6B:
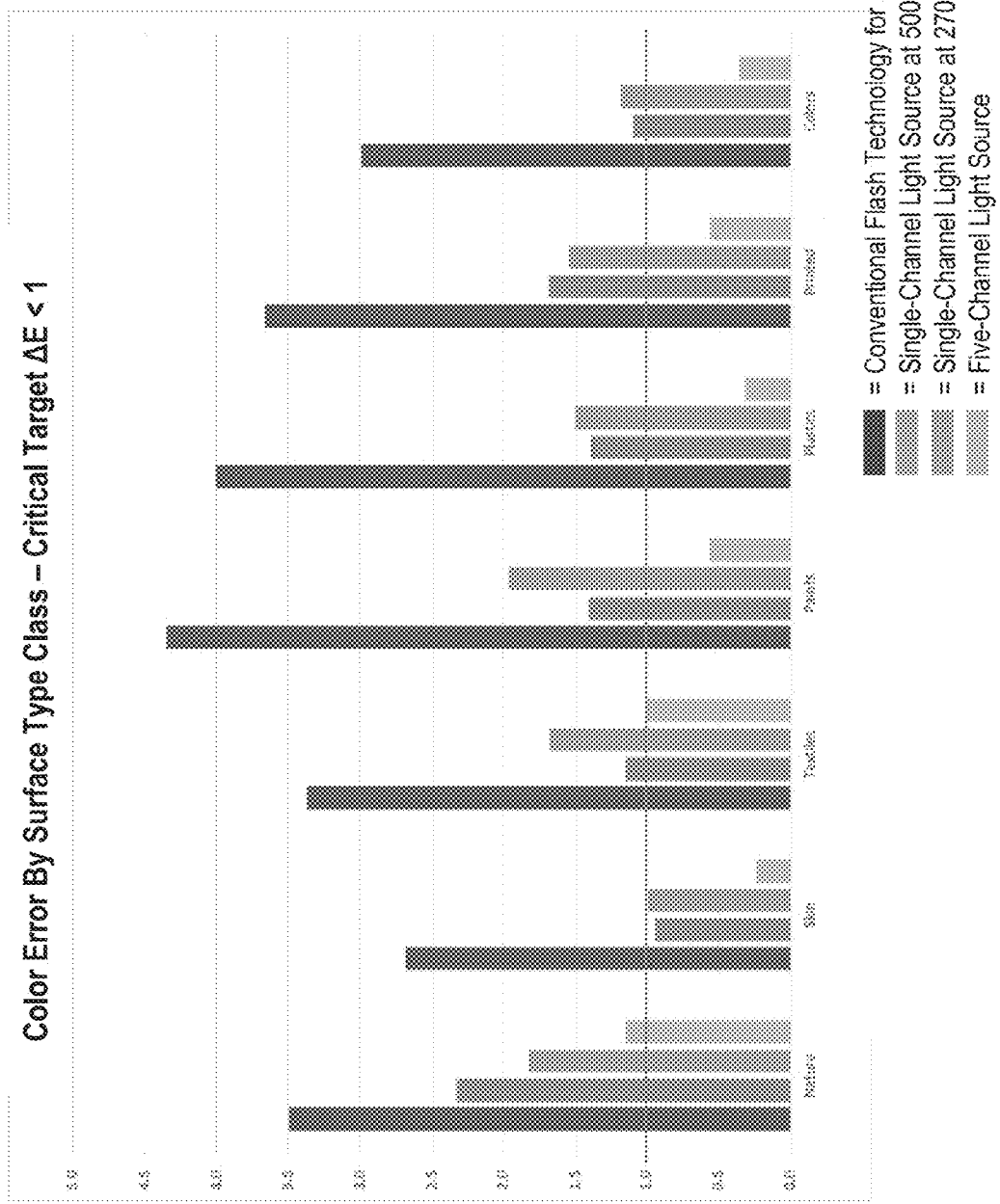
FIG. 6B depicts ΔE by surface type for four different types of light source: conventional flash technology for mobile phones; a two-channel light source at 5000K; a two-channel light source at 2700K; and a five-channel light source as described herein.

FIG. 6B depicts ΔE by surface type for four different types of light source: conventional flash technology for mobile phones; a two-channel light source at 5000K; a two-channel light source at 2700K; and a five-channel light source as described herein. The results of examining a variety of different surface types (e.g., nature, skin, textiles, etc.) are shown here. Similar results were discovered for other surface types.

For a given light source, ΔE will vary based on the characteristics of the surface being illuminated. For example, as shown in FIG. 6B, ΔE is typically higher for nature surfaces than skin surfaces. The five-channel light sources described herein can consistently produce lower ΔE values than these other light sources, regardless of surface type. Moreover, these five-channel light sources can generally reduce the color loss below the visually distinguishable threshold (i.e., ΔE<1) with limited exceptions. Here, for example, ΔE associated with nature surfaces may be slightly greater than one, though the five-channel light source still results in a much smaller ΔE than these other light sources. Moreover, higher ΔE for nature surfaces is not likely to be a significant issue as images of outdoor environments are generally not captured in conjunction with a flash.

Figure 7:
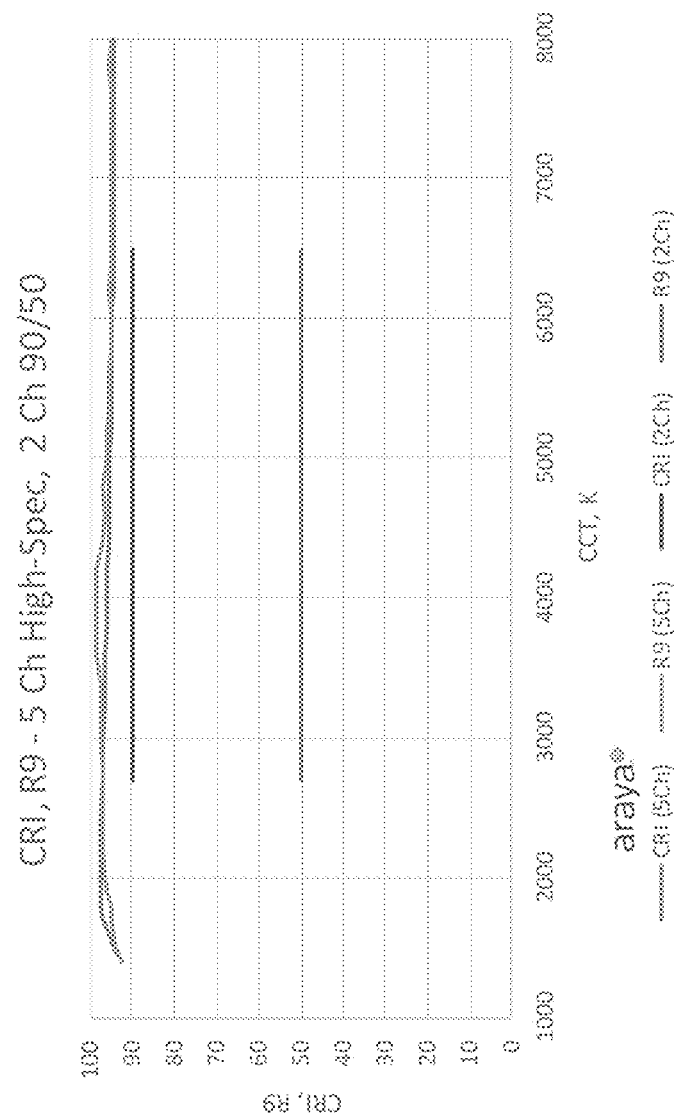
FIG. 7 depicts two different color properties (i.e., CRI and R9) for two different types of illuminant: a two-channel light source and a five-channel light source.

FIG. 7 depicts two different color properties (i.e., CRI and R9) for two different types of illuminant: a two-channel light source and a five-channel light source. As shown in FIG. 7, a two-channel light source will typically exhibit CRI values of approximately 90 and R9 values of approximately 50 across a tunable range of 2700-6500K. To account for the discoloration, significant post-processing must usually be performed on images captured in conjunction with flashes produced by the two-channel light source. Conversely, the five-channel light source may exhibit CRI values and R9 values of approximately 92-98 over a tunable range of 1500-8000K.

The five-channel light source may also be optimized for flash events at certain CCTs. In such embodiments, the five-channel light source could be designed to have higher CRI values and/or R9 values than those listed above in certain ranges (e.g., 4000-5000K, 5000-6000K, etc.).

Figure 8A:
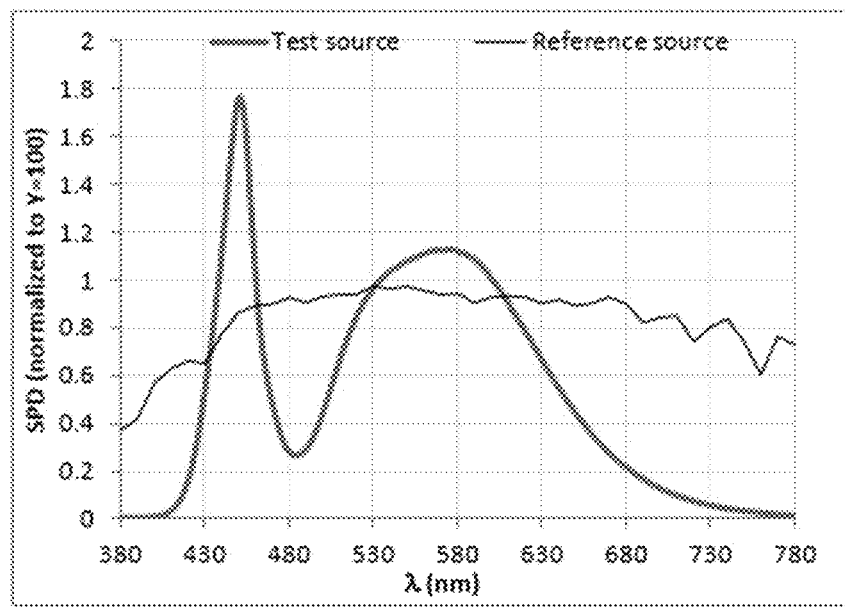
FIGS. 8A-D illustrate the ability of four different types of light source to mimic the visible spectrum of an ambient scene.
Figure 8B:
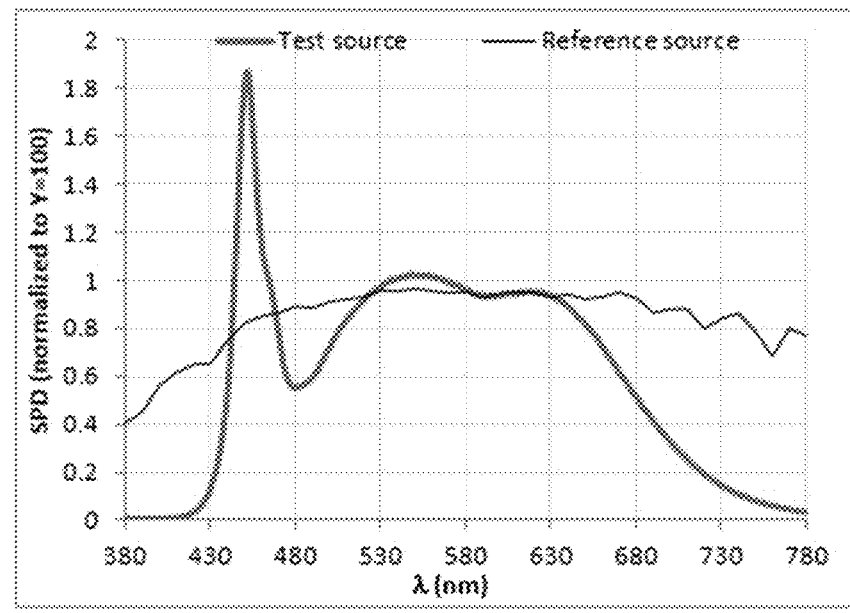
Figure 8C:
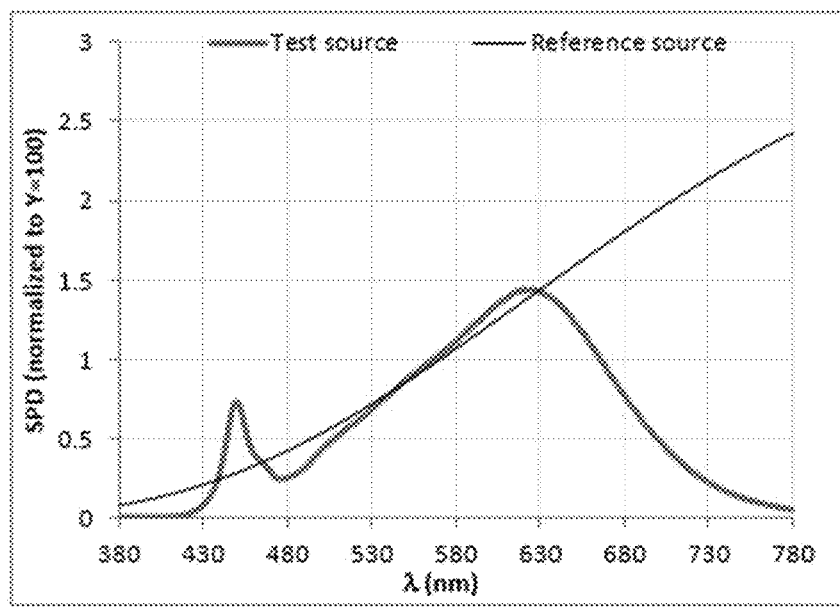
Figure 8D:
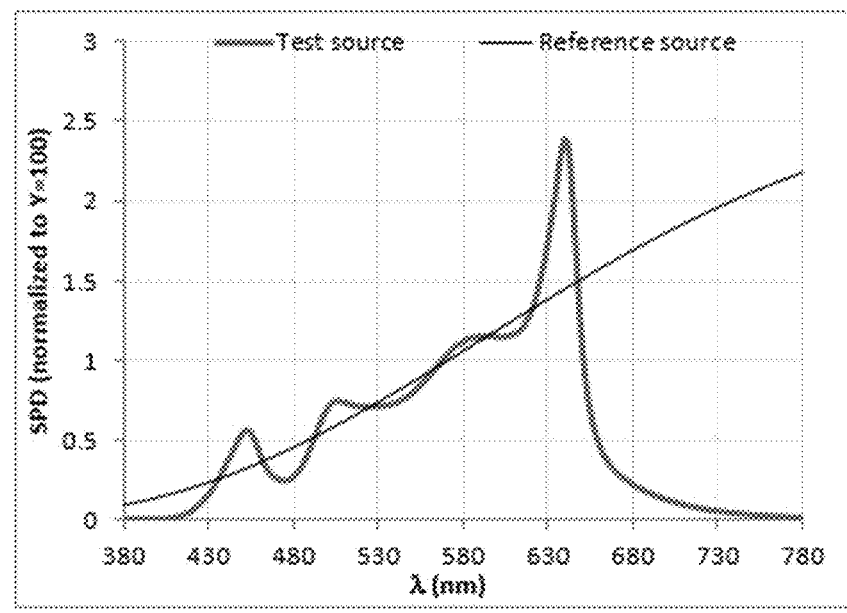

FIGS. 8A-D illustrate the ability of four different types of light source to mimic the visible spectrum of an ambient scene. FIG. 8A corresponds to conventional flash technology for mobile phones having certain operating characteristics (e.g., 5000K CCT, 70 CRI, 0 R9). FIG. 8B corresponds to a two-channel light source having a first set of operating characteristics (e.g., 5000K CCT, 90 CRI, 50 R9), while FIG. 8C corresponds to a two-channel light source having a second set of operating characteristics (e.g., 2700K CCT, 90 CRI, 50 R9). FIG. 8D, meanwhile, corresponds to a five-channel light source having certain operating characteristics (e.g., 97 CRI, 97 R9, 95 Rf). In comparison to these other light sources, the five-channel light source can more accurately reproduce a variety of different colors across a wider range of wavelengths, as evidenced by its ability to more closely align with the reference source.

Figure 9A:
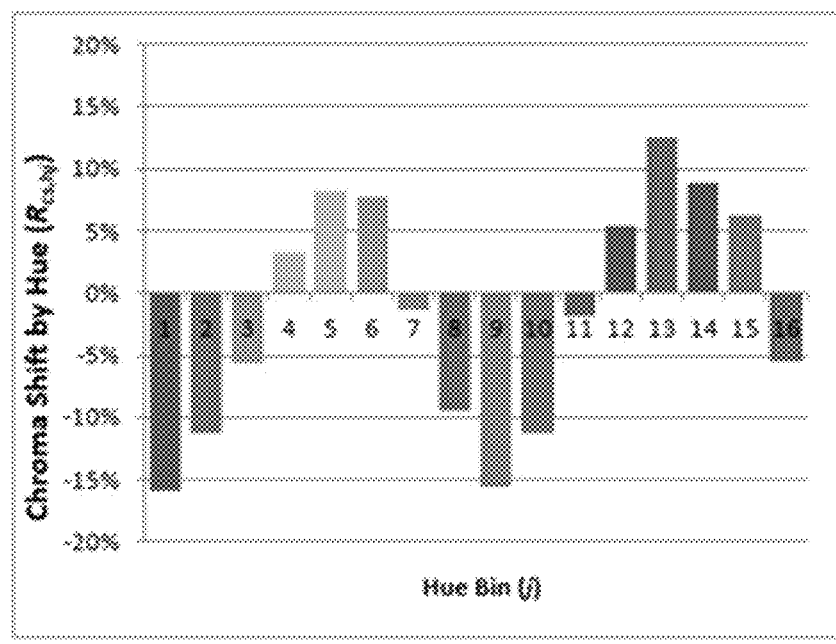
FIGS. 9A-D illustrate the ability of the four different types of light source to properly mimic chromaticity of an ambient scene.
Figure 9B:
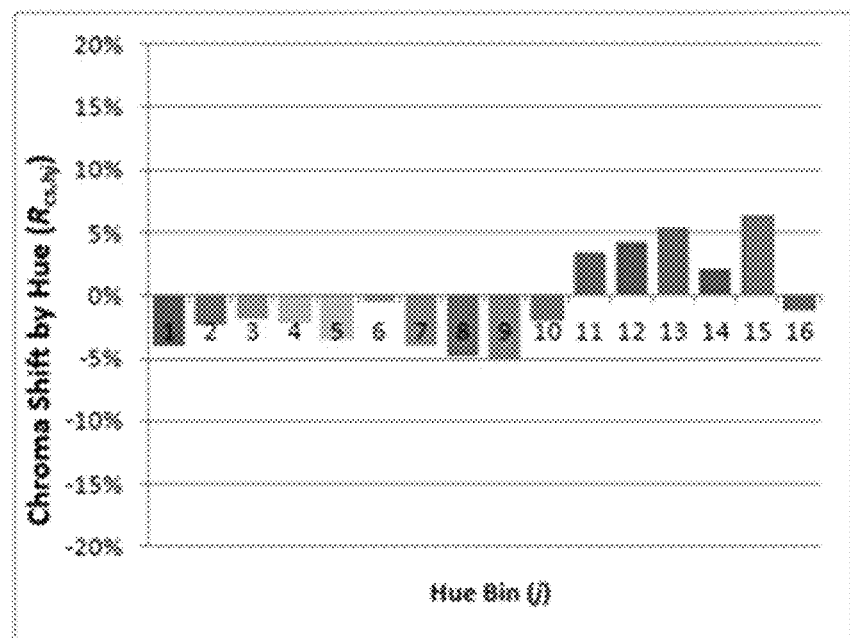
Figure 9C:
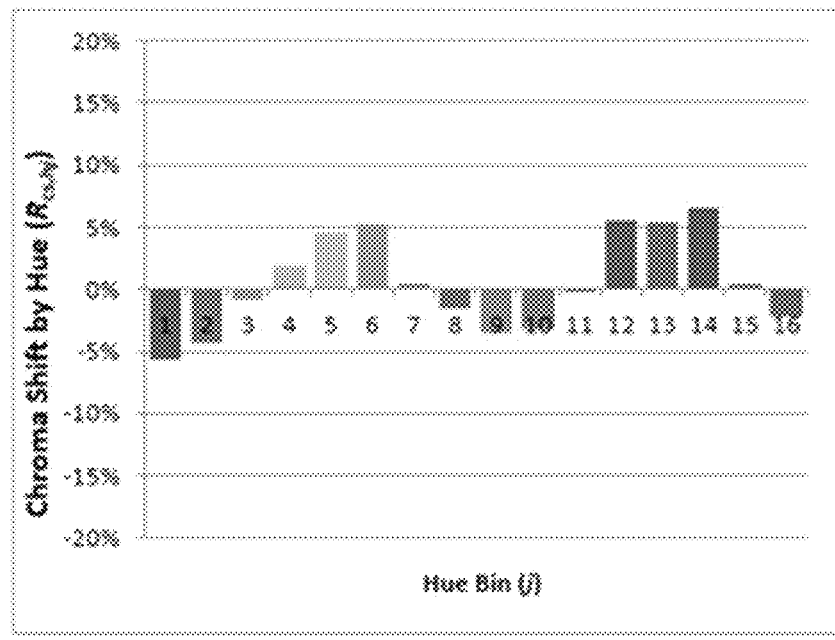
Figure 9D:
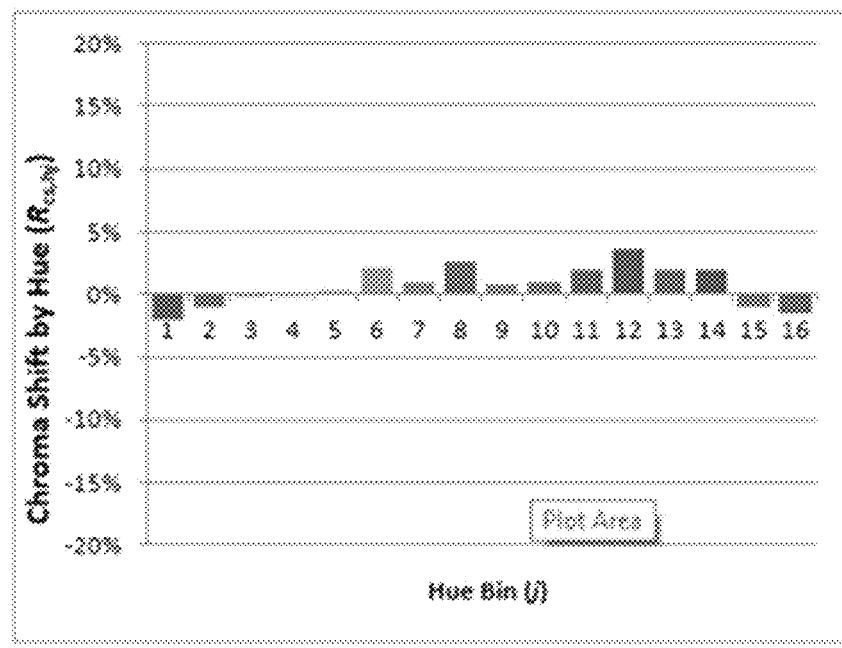

FIGS. 9A-D illustrate the ability of the four different types of light source to properly mimic chromaticity of an ambient scene. More specifically, FIGS. 9A-D depict total chromaticity shift across 16 different hue bins for each of the four different types of light source. FIG. 9A corresponds to the conventional flash technology for mobile phones. FIG. 9B corresponds to the two-channel light source having the first set of operating characteristics. FIG. 9C corresponds to the two-channel light source having the second set of operating characteristics. FIG. 9D corresponds to the five-channel light source. In comparing FIGS. 9A-D, those skilled in the art will recognize that the five-channel light source can be designed to minimize the average chromaticity shift across these 16 different hue bins. Said another way, in comparing FIGS. 9A-D, those skilled in the art will recognize that the five-channel light source can more accurately reproduce colors across the visible spectrum in comparison to these other light sources.

Figure 10:
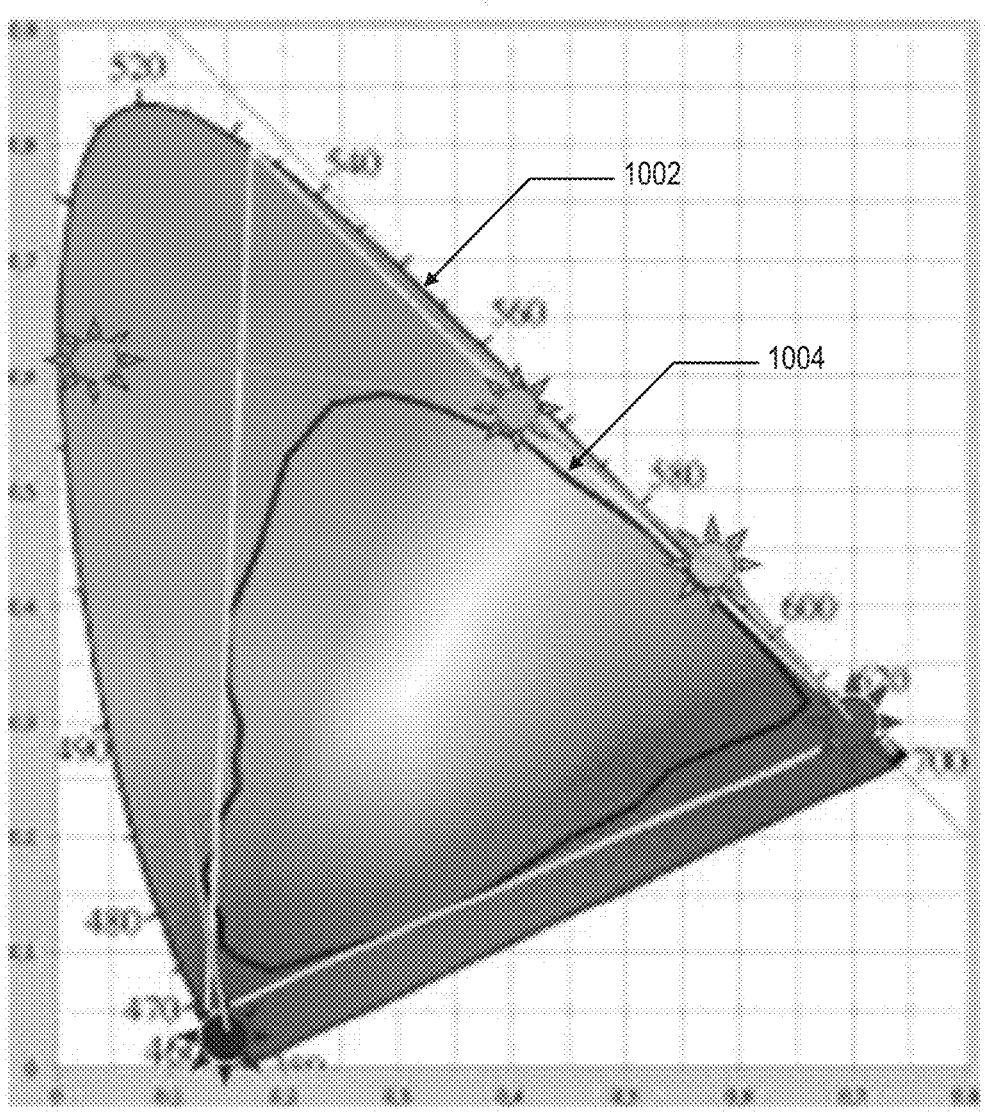
FIG. 10 illustrates the total achievable color gamut of a five-channel light source in comparison to a conventional chromaticity diagram.

FIG. 10 illustrates the total achievable color gamut 1004 of a five-channel light source in comparison to a conventional chromaticity diagram 1002. The chromaticity diagram 1002 characterizes colors by a luminance parameter and two color coordinates, which together specify a single point in the chromaticity diagram 1002. Colors can precisely be compared using the chromaticity diagram 1002 because each parameter is based on the spectral power distribution (SPD) of the light emitted from a light source and factored by sensitivity curves measured for the human eye.

In addition to white light of various CCTs, the five-channel light source can also be configured to produce colored light by separately driving/addressing each color channel. Said another way, the five-channel light source can produce fully saturated flashes by separately driving each color channel. Assume, for example, that the five-channel light source includes five separate color channels configured to produce blue light, cyan light, lime light, amber light, and red light. To produce red light, a controller may cause current/voltage to be provided only to the red color channel. Similarly, to produce orange light, the controller may cause current/voltage to be provided to the red color channel and the amber color channel. Thus, the controller may be able to produce light in a variety of different colors (e.g., in accordance with a variety of color mixing models) in addition to white light at a variety of different CCTs.

FIG. 11 illustrates how the five-channel light sources described herein can substantially improve in terms of color reproducibility in comparison to two-channel light sources. Because a five-channel light source can achieve consistently better results across these different metrics, an image captured in conjunction with a flash produced by the five-channel light source will be noticeably better than an image captured in conjunction with a flash produced by a two-channel light source. The improved flash may also allow the amount of post-processing to be drastically reduced (e.g., because significant post-processing is no longer needed to address discoloration).

Establishing Effect of Each Color Channel

In some embodiments, a multi-channel light source may automatically tune a flash to produce white light having an appropriate formulation based on a scene and any other illuminants shining on the scene (e.g., sunlight, incandescent bulbs, halogen bulbs, fluorescent bulbs). The effect of each color channel of a multi-channel light source can be established in at least two different ways. While the processes described below involve a five-channel light source, those skilled in the art will recognize the processes are equally applicable to multi-channel light sources having any number of channels.

FIG. 12 illustrates a process 1200 for acquiring color information that may be useful in tuning each color channel of a five-channel light source in preparation for a flash event. The light source can initially strobe through each color channel of the five color channels. More specifically, the light source can produce a series of discrete colored flashes by separately driving the illuminant(s) corresponding to a first color channel (step 1201), a second color channel (step 1202), a third color channel (step 1203), a fourth color channel (step 1204), and a fifth color channel (step 1205). Such action will sequentially illuminate the scene with colored light of five different colors. For example, the scene may be flooded with blue light, cyan light, lime light, amber light, and red light in any order.

By pre-flashing each color channel, valuable information regarding the effect of flash contribution on image characteristics (e.g., pixel lightness, hue, and chromaticity) can be discovered. Each discrete flash can vary in length from 15 milliseconds to 100 milliseconds. Moreover, each discrete flash may produce approximately 750-800 lumens (e.g., due to an application of 2-3 amps at 3 volts for 15 milliseconds).

An image sensor may capture a series of images in conjunction with the series of colored flashed (step 1206). More specifically, the image sensor may capture at least one image under the colored flash produced by each color channel of the multi-channel light source. Following the steps 1201-1206, two different data sets will be available to a characterization module: first data generated by the multi-channel light source and second data generated by the image sensor. The first data may include various illuminance characteristics (e.g., driving current, flux, operating temperature, wavelength), while the second data may include image data representing response of the image sensor. The image sensor may also capture a reference image without any flash (step 1207).

Thereafter, a characterization module can examine the first data and the second data. More specifically, the characterization module may examine data corresponding to the effect of each color channel (step 1208). To acquire the data, the characterization module may, for a given color channel, subtract image data associated with the reference image from image data associated with the corresponding image of the series of images. For example, if the characterization module would like to establish the effect of the lime color channel, the characterization module will subtract the reference image from the image taken in conjunction with the lime-colored flash.

Moreover, the characterization module may determine an appropriate light formulation based on the effect of each color channel (step 1209). For example, the characterization module may apply a solver algorithm that determines, based on a reference set of curves corresponding to different combinations of driving current and flux, an appropriate brightness and color point(s) necessary to achieve a particular color model. The characterization module and the solver algorithm may reside in a memory of the multi-channel light source or a memory of the electronic device (e.g., mobile phone) in which the multi-channel light source is housed. The white light formulation may include a specific operating parameter for each color channel such that, when the five color channels are illuminated in concert, while light produced by the multi-channel light source will have a particular CCT. Such action may ensure that an image captured in conjunction with the white light will more accurately replicate how the ambient environment is actually seen by the human eye.

In some embodiments, the characterization module determines an appropriate light formulation corresponding to a flash setting selected by a user. For example, the characterization module may receive input indicative of a selection of a flash setting by a user (e.g., via an interface accessible on the electronic device in which the multi-channel light source resides), and then generate an arbitrary white flash based on a color mixing model corresponding to the selected flash setting. As noted above, the characterization module may alternatively determine the flash setting automatically on behalf of the user based on time, location, etc. For example, in response to determining that the user is attempting to capture an image of a scene at night, the characterization module may identify the appropriate light formulation.

FIG. 13 illustrates another process 1300 for acquiring color information that may be useful in tuning each color channel of a five-channel light source in preparation for a flash event. Rather than strobe through each color channel separately, the light source can instead produce a series of discrete substantially white flashes by driving different combinations of channels.

Here, for example, the light source can produce a series of discrete substantially white flashes by driving the illuminant(s) corresponding to all color channels except the first color channel (step 1301), the second color channel (step 1302), the third color channel (step 1303), the fourth color channel (step 1304), and the fifth color channel (step 1305). Such action will sequentially illuminate the scene with substantially white light, though the tint will differ slightly as each flash will be missing the illuminant(s) of a single color channel.

An image sensor may capture a series of images in conjunction with the series of substantially white flashes (step 1306). More specifically, the image sensor may capture at least one image under the substantially white flash produced without each color channel of the multi-channel light source. Following the steps 1301-1306, two different data sets will be available to the characterization module: first data generated by the multi-channel light source and second data generated by the image sensor. The first data may include various illuminance characteristics (e.g., driving current, flux, operating temperature, wavelength), while the second data may include image data representing response of the image sensor.

The multi-channel light source may also produce a reference flash by activating the illuminant(s) corresponding to all color channels (step 1307). In such embodiments, the image sensor can capture a reference image in conjunction with the reference flash (step 1308). Such action enables a characterization module to readily determine the effect of each color channel without requiring that each color channel be separately addressed.

Thereafter, the characterization module can examine data corresponding to the effect of each color channel (step 1309). The characterization can establish the effect of each color channel via process 1300 of FIG. 13 and process 1200 of FIG. 12, though the effect is established in different manners. Here, for example, the characterization module may, for a given color channel, subtract image data associated with the image of the series of images in which the given color channel was not illuminated from the image data associated with the reference image. For example, if the characterization module would like to establish the effect of the lime color channel, the characterization module will subtract the image taken in conjunction with the substantially white flash that does not include lime-colored light from the reference image.

In comparison to the series of colored flashes produced by process 1200 of FIG. 12, the series of substantially white flashed produced by process 1300 of FIG. 13 may be less objectionable to the human eye. Steps 1309-1301 of FIG. 13 may be substantially identical to steps 1208-1209 of FIG. 12.

Those skilled in the art will recognize that other combinations of color channels may be illuminated together, so long as the characterization module can ultimately determine the effect of each individual color channel.

Unless contrary to physical possibility, it is envisioned that the steps described above may be performed in various sequences and combinations. For example, the light source may be configured to illuminate all color channels before illuminating subsets of color channels (e.g., perform steps 1307-1308 before steps 1301-1306). As another example, the light source may be configured to illuminate all color channels between each flash involving a subset of the channels (e.g., perform steps 1307-1308 before step 1302, step 1303, step 1304, and step 1305).

Other steps may also be included in some embodiments. For example, after determining the appropriate white light formulation, the light source may produce a flash that illuminates the ambient environment during image capture by an electronic device. More specifically, the light source may produce the flash responsive to receiving input indicative of user input specifying that an image be captured. The user input may be in the form of tactile input provided along a touch-sensitive display or a mechanical button accessible along the exterior of the electronic device. As another example, after determining the appropriate white light formulation, the multi-channel light source may produce a series of flashes that illuminate the ambient environment during video capture by the electronic device. In such environments, the light source may communicate with the electronic device to ensure that the series of flashes temporally align with each video frame captured by the electronic device.

In some instances, an electronic device may employ "pre-image flashing" to establish the effect of each color channel of a multi-channel light source, and then capture an image without any flash. For example, this may be done for outdoor scenes in which a flash is unnecessary. Pre-image flashing may be formed additively (i.e., in accordance with process 1200 of FIG. 12) or subtractively (i.e., in accordance with process 1300 of FIG. 13). In some embodiments, the "pre-image" captured in conjunction with each "pre-image flash" can be compiled into the final image. Thus, a separate image may not necessarily be captured following the series of images captured in conjunction with the pre-image flashes. These pre-images may also be shot at different shutter speeds, resolutions, etc., than the final image. For example, the electronic device may be configured to capture pre-images at a first resolution and an additional image at a second resolution. Generally, the first resolution will be lower than the second resolution since spectral information can be extracted regardless of whether the resolution is sufficient for photography purposes.

Advantages of Multi-Channel Light Sources

Various advantages are enabled when the light sources described herein are used to produce a flash. Such advantages include:

- Broad-spectrum light having a high gamut area can be created by mixing the light produced by multiple color channels corresponding to different colors. By capturing images under the broad-spectrum light, image quality can be naturally increased (e.g., in comparison to post-processing the images).
- By controlling gamut (e.g., by separately addressing each color channel), the light source can flash specific color channels (or combinations of color channels) at a high speed to analyze the relative reflected light of different colors. For example, the light source may separately flash each color channel before the actual flash event to determine the white light formulation (also referred to as the "flash formulation") that will result in an image having the highest possible quality. The flash formulation can be defined by values for characteristics such as CCT, saturation level, etc. Alternatively, these characteristics can be pre-manipulated to develop a desired effect.
- The ability to separately access the gamut of colors producible by the light source creates opportunities for third parties (e.g., software developers) to leverage individual color access. For example, a light source may be configured to blink red responsive to a determination that the temperature of the electronic device has exceeded a threshold, the power available to the electronic device has fallen below a threshold, etc. As another example, the light source may be configured to blink blue responsive to a determination that the electronic device is connected to another electronic device via a short-range wireless protocol (e.g., Bluetooth®). The light source may be configured to illuminate in various colors, patterns, etc. Thus, an individual could select a color via an interface shown on the display of the electronic device, and then point the light source toward a white wall to determine the pantone color desired for painting.
- Full-spectrum illumination also offers an opportunity to generate circadian light that may be used, for example, as a projected source rather than the backlit sources currently available in many displays (e.g., liquid-crystal displays (LCDs)).
- Light sources having multiple color channels (e.g., three channels, five channels, seven channels, etc.) plus dies can collectively deliver greater output in lumens than conventional flash technologies. The additional output may present opportunities for diffusion in conjunction with mixing.
- Different geometries can be created that offer better "roundness" of the light source with matched colors that complement one another to create symmetrically distributed white light.

Given that the photography systems of electronic devices are closed (i.e., the strobe spectrum, spectral profiles of the camera sensor, and flash contribution to pixel lightness, hue, and chromaticity are all known), an imaging apparatus can computationally compensate for low-fidelity, flash-induced color distortion and then extrapolate missing color information. The imaging apparatus may include a multi-channel light source, a camera sensor, a controller (e.g., a processor), a solver module, or any combination thereof.

Fidelity Comparisons for an Illustrative Example

Several examples of fidelity comparisons between the flash technology included in a series of conventional electronic devices and a five-channel light source having a round, 5,000-lumen array of illuminants are provided below. Here, each fidelity comparison is based on a Fujifilm® grey card having RGBCMY color points and a DSC Labs ChromaMatch® chart.

FIG. 14 illustrates a process 1400 for performing a processing procedure on images captured by an electronic device. Initially, at least one color reference object is imaged by the electronic device in conjunction with a flash produced by the built-in flash technology (step 1401). Multiple color reference objects will often be imaged by the electronic device to derive additional information on the color properties of objects within the ambient environment. Examples of color reference objects include color charts, such as the Fujifilm® grey card having RGBCMY color points and the DSC Labs ChromaMatch® chart.

The at least one color reference object can then be imaged in conjunction with a flash produced by the five-channel light source (step 1402). The examples provided below correspond to light produced by a light source having five separately addressable color channels that is separate from the electronic device. However, the five-channel light source could also be incorporated into the electronic device itself (e.g., instead of, or in addition to, the built-in flash technology).

Thereafter, data corresponding to the first image (i.e., the image taken in conjunction with the flash produced by the built-in flash technology) and data corresponding to the second image (i.e., the image taken in conjunction with the flash produced by the five-channel light source) can be examined to detect improvements in color reproducibility (step 1403).

FIGS. 15-19 illustrate the improved fidelity of a five-channel light source in comparison to conventional flash technology. FIG. 15 depicts a fidelity comparison between the five-channel light source and the built-in flash technology of a Huawei® Nexus 6P mobile phone. FIG. 16 depicts a fidelity comparison between the five-channel light source and the built-in flash technology of a Google Pixel™ mobile phone. FIG. 17 depicts a fidelity comparison between the five-channel light source and the built-in flash technology of a Samsung® Galaxy mobile phone. FIG. 18 depicts a fidelity comparison between the five-channel light source and the built-in flash technology of an Apple iPhone® 7 mobile phone. FIG. 19 depicts a fidelity comparison between the five-channel light source and the built-in flash technology of an Apple iPhone® X mobile phone.

Electronic devices that employ conventional flash technologies rely heavily on internal algorithms to post-process images to create a neutral white light. Post-processing can be highly effective at creating a neutral white light despite the limited spectrum of the illuminants (e.g., LEDs) used in these conventional flash technologies. However, the resulting color space of the image will be heavily affected by post-processing, as well as the lack of color information in the source.

To quantify the color space, it is often helpful to look at several different color points. Here, for example, the color space is defined in terms of red (R), green (G), blue (B), cyan (C), magenta (M), and yellow (Y). Red, green, and blue (RGB) are measured with respect to 255 distinct points of information. Therefore, a "true" red will be 255/255 in the red metric, a "true" green will be 255/255 in the green metric, and a "true" blue will be 255/255 in the blue metric. Cyan, magenta, and yellow (CMY), meanwhile, are measured with respect to two of the three RGB colors. By comparing the values for RGBCMY, several different metrics can be quantified, including the ability of the camera sensor (also referred to as an "image sensor") to produce a neutral white light, the ability to produce a neutral white light during post-processing, and the resulting color space following post-processing.

In view of FIGS. 15-19, those skilled in the art will recognize that the five-channel light source consistently produces superior color rendering, as well as a more complete color gamut, across each reference electronic device. Note that some of the electronic devices are more reliant on their flash for white balance than others. For example, the image sensors in the Huawei® Nexus 6P mobile phone and the Samsung® Galaxy mobile phone appear inferior to the image sensor in the Apple iPhone® 7 mobile phone when a flash is produced by the built-in flash technology, but outperform the image sensor in the Apple iPhone® 7 mobile phone when a flash is produced by the five-channel light source. Thus, the Apple iPhone® 7 mobile phone appears to be more reliant on post-processing to create a neutral white light, and the Huawei® Nexus 6P mobile phone and the Samsung® Galaxy mobile phone appear to have inferior built-in flash technology.

Superior image sensors (e.g., those in the Apple iPhone® X mobile phone) can take advantage of greater information about discoloration. To improve image quality, these superior image sensors can be paired with improved processing software designed to overcome the shortcomings associated with inferior light sources. However, image quality can be further improved when images are captured in conjunction with flashes produced by an improved light source (e.g., a five-channel light source).

Processing System

Figure 20:
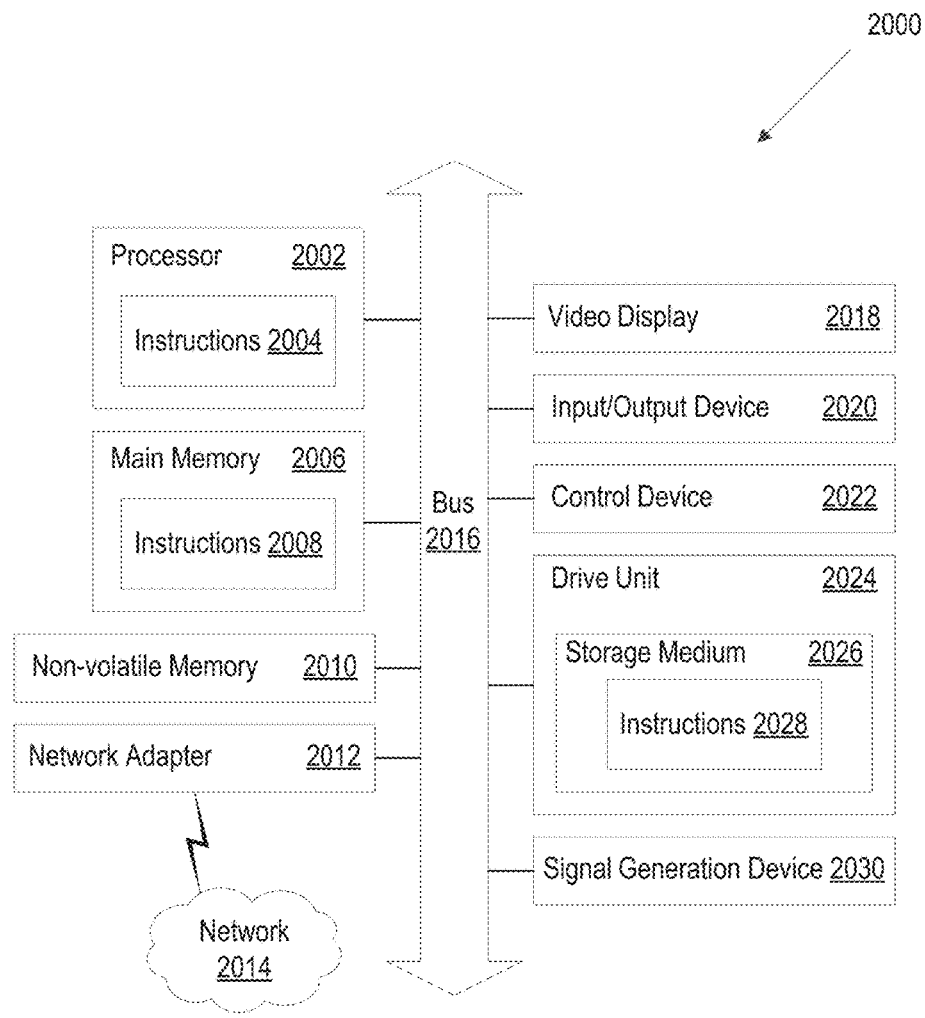
FIG. 20 is a block diagram illustrating an example of a processing system in which at least some operations described herein can be implemented.

FIG. 20 is a block diagram illustrating an example of a processing system 2000 in which at least some operations described herein can be implemented. For example, some components of the processing system 2000 may be hosted on an electronic device that includes a multi-channel light source (e.g., light source 100 of FIGS. 1A-B) or on an electronic device that is communicatively connected to a multi-channel light source (e.g., via a cable connection or a wireless connection).

The processing system 2000 may include one or more central processing units ("processors") 2002, main memory 2006, non-volatile memory 2010, network adapter 2012 (e.g., network interface), video display 2018, input/output devices 2020, control device 2022 (e.g., keyboard and pointing devices), drive unit 2024 including a storage medium 2026, and signal generation device 2030 that are communicatively connected to a bus 2016. The bus 2016 is illustrated as an abstraction that represents one or more physical buses and/or point-to-point connections that are connected by appropriate bridges, adapters, or controllers. The bus 2016, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 2000 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 2000.

While the main memory 2006, non-volatile memory 2010, and storage medium 2026 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 2028. The term "machine-readable medium" and "storage medium" shall also be taken to include any medium that is capable of storing, encoding, or carrying a set of instructions for execution by the processing system 2000.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 2004, 2008, 2028) set at various times in various memory and storage devices in a computing device. When read and executed by the one or more processors 2002, the instruction(s) cause the processing system 2000 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 2010, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 2012 enables the processing system 2000 to mediate data in a network 2014 with an entity that is external to the processing system 2000 through any communication protocol supported by the processing system 2000 and the external entity. The network adapter 2012 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 2012 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for capturing an image, the method comprising:
accessing a database that associates one or more color mixing models with previously recorded spectral properties of a multi-channel light source,
wherein the multi-channel light source includes at least three color channels, each of which includes one or more illuminants configured to produce a substantially similar color;
characterizing a spectral property of the multi-channel light source by
producing a series of flashes in which each color channel is separately illuminated,
causing a series of images to be captured in conjunction with the series of flashes,
identifying a spectral characteristic of each color channel by examining the image in the series of images that is associated with the corresponding flash, and
examining the spectral characteristics to discover the spectral property of the multi-channel light source;
identifying an appropriate color mixing model from among the one or more color mixing models based on the spectral property; and
simultaneously driving the at least three color channels by separately addressing each color channel in accordance with the appropriate color mixing model, thereby causing the multi-channel light source to produce a flash of white light having a particular correlated color temperature (CCT).

2. A method for capturing an image, the method comprising:
accessing a database that associates one or more color mixing models with previously recorded spectral properties of a multi-channel light source,
wherein the multi-channel light source includes at least three color channels, each of which includes one or more illuminants configured to produce a substantially similar color;
characterizing a spectral property of the multi-channel light source by
producing a reference flash in which the at least three color channels are simultaneously illuminated,
causing a reference image to be captured in conjunction with the reference flash,
producing a series of flashes in which all color channels except one are simultaneously illuminated,
causing a series of images to be captured in conjunction with the series of flashes,
identifying a spectral characteristic of each color channel by estimating a corresponding discoloration effect,
wherein the corresponding discoloration effect for a given color channel is estimated by comparing the image associated with the flash in which the given color channel was not illuminated to the reference image, and
examining the spectral characteristics to discover the spectral property of the multi-channel light source;
identifying an appropriate color mixing model from among the one or more color mixing models based on the spectral property; and
simultaneously driving the at least three color channels by separately addressing each color channel in accordance with the appropriate color mixing model, thereby causing the multi-channel light source to produce a flash of white light having a particular correlated color temperature (CCT).

3. The method of claim 1, wherein the multi-channel light source includes at least five color channels.

4. The method of claim 1, wherein the multi-channel light source includes at least seven color channels.

5. The method of claim 1, wherein the multi-channel light source includes four color channels configured to produce red light, blue light, green light, and white light.

6. The method of claim 1, wherein the multi-channel light source includes four color channels configured to produce red light, blue light, green light, and amber light.

7. The method of claim 1, wherein the multi-channel light source includes five color channels configured to produce red light, blue light, amber light, cyan light, and lime light.

8. The method of claim 1, wherein the one or more illuminants in each color channel are light-emitting diodes (LEDs).

9. The method of claim 2, wherein the multi-channel light source includes at least five color channels.

10. The method of claim 2, wherein the multi-channel light source includes at least seven color channels.

11. The method of claim 2, wherein the multi-channel light source includes four color channels configured to produce red light, blue light, green light, and white light.

12. The method of claim 2, wherein the multi-channel light source includes four color channels configured to produce red light, blue light, green light, and amber light.

13. The method of claim 2, wherein the multi-channel light source includes five color channels configured to produce red light, blue light, amber light, cyan light, and lime light.

14. The method of claim 2, wherein the one or more illuminants in each color channel are light-emitting diodes (LEDs).

\* \* \* \* \*